US009228248B2

(12) United States Patent
Sugita et al.

(10) Patent No.: US 9,228,248 B2
(45) Date of Patent: Jan. 5, 2016

(54) METHOD OF RECOVERING RARE-EARTH ELEMENTS

(71) Applicant: NIPPON LIGHT METAL COMPANY, LTD., Tokyo (JP)

(72) Inventors: Kaoru Sugita, Shizuoka (JP); Yasushi Kobayashi, Shizuoka (JP); Yoshihiro Taguchi, Shizuoka (JP); Satoshi Takeda, Shizuoka (JP); Yuji Ota, Shizuoka (JP); Masashi Ojiri, Shizuoka (JP); Kazuhiro Oda, Shizuoka (JP); Hiroshi Sano, Shizuoka (JP)

(73) Assignee: NIPPON LIGHT METAL COMPANY, LTD., Tokyo (JP)

( * ) Notice: Subject to any disclaimer, the term of this patent is extended or adjusted under 35 U.S.C. 154(b) by 0 days.

(21) Appl. No.: 14/389,304

(22) PCT Filed: Dec. 7, 2012

(86) PCT No.: PCT/JP2012/081855
§ 371 (c)(1),
(2) Date: Sep. 29, 2014

(87) PCT Pub. No.: WO2013/145455
PCT Pub. Date: Oct. 3, 2013

(65) Prior Publication Data
US 2015/0086449 A1    Mar. 26, 2015

(30) Foreign Application Priority Data

Mar. 30, 2012 (JP) .................................. 2012-081228

(51) Int. Cl.
*C22B 59/00* (2006.01)
*B09B 3/00* (2006.01)
(Continued)

(52) U.S. Cl.
CPC . *C22B 59/00* (2013.01); *B09B 3/00* (2013.01); *C01F 17/00* (2013.01); *C22B 3/0005* (2013.01);
(Continued)

(58) Field of Classification Search
None
See application file for complete search history.

(56) References Cited

U.S. PATENT DOCUMENTS

| 2,835,554 | A | * | 5/1958 | Pardee | ............................ | 423/136 |
| 5,030,424 | A | | 7/1991 | Fulford et al. | | |
| 2008/0179253 | A1 | * | 7/2008 | Clark et al. | ................... | 210/660 |

FOREIGN PATENT DOCUMENTS

| JP | 59-46008 A | 3/1984 |
| JP | 62-165305 A | 7/1987 |

(Continued)

OTHER PUBLICATIONS

Ochsenkuhn-Petropoulou et al., Pilot-Plant Investigation of the Leaching Process for the Recovery of Scandium from Red Mud, Ind. Eng. Chem. Res., vol. 41, pp. 5794-5801 (2002).*

(Continued)

*Primary Examiner* — Melissa Swain
(74) *Attorney, Agent, or Firm* — Birch, Stewart, Kolasch & Birch, LLP

(57) ABSTRACT

Provided is a method of recovering rare-earth elements by which rare-earth elements can be recovered efficiently from a bauxite residue serving as a raw material and containing the rare-earth elements. Specifically provided is a method of recovering rare-earth elements from a raw material, the raw material being a bauxite residue produced as a by-product in a Bayer process, the method including: using a bauxite residue having a specific surface area of 35 $m^2/g$ or more; adding, to the raw material bauxite residue, a liquid leaching agent formed of an aqueous solution of at least one kind of mineral acid selected from sulfuric acid, hydrochloric acid, nitric acid, and sulfurous acid, thereby preparing a slurry having a liquid-solid ratio of 2 to 30 and a pH of 0.5 to 2.2; subjecting the slurry to leaching treatment of the rare-earth elements under a temperature condition of room temperature to 160° C.; subjecting the slurry after the leaching treatment to solid-liquid separation, yielding a leachate; and separating and recovering the rare-earth elements from the leachate.

28 Claims, 3 Drawing Sheets
(1 of 3 Drawing Sheet(s) Filed in Color)

(51) Int. Cl.
*C01F 17/00* (2006.01)
*C22B 3/26* (2006.01)
*C22B 3/04* (2006.01)
*C22B 3/20* (2006.01)
*C22B 3/44* (2006.01)
*C22B 7/00* (2006.01)

(52) U.S. Cl.
CPC ... *C22B 3/04* (2013.01); *C22B 3/20* (2013.01); *C22B 3/44* (2013.01); *C22B 7/00* (2013.01); *C22B 7/007* (2013.01); *Y02W 30/54* (2015.05)

(56) References Cited

FOREIGN PATENT DOCUMENTS

| | | |
|---|---|---|
| JP | 9-176757 A | 7/1997 |
| JP | 9-184028 A | 7/1997 |
| JP | 2000-313928 A | 11/2000 |
| JP | 2005-120420 A | 5/2005 |

OTHER PUBLICATIONS

The Notification of Transmittal of Translation of the International Preliminary Report on Patentability (IPRP) along with an English translation of the IPRP, dated Oct. 23, 2014, issued in the corresponding International Application No. PCT/JP2012/081855.

International Search Report for PCT/JP2012/081855 mailed on Mar. 26, 2013.

Ochsenkuhn-Petropoulou, "Pilot-Plant Investigation of the Leaching Process for the Recovery of Scandium from Red Mud", Ind. Eng. Chem. Res., vol. 41, 2002, pp. 5794-5801.

* cited by examiner

METHOD OF RECOVERING RARE-EARTH ELEMENTS

BACKGROUND OF THE INVENTION

1. Field of the Invention

The present invention relates to a method of recovering rare-earth elements involving using, as a raw material, a solid residue which is produced as a by-product in a Bayer process for separating and collecting an aluminum component in bauxite from the bauxite (The solid residue is hereinafter referred to as "bauxite residue." A bauxite residue containing $Fe_2O_3$ as a main component has a red color and is generally called "red mud."), and which contains Sc, Y, and lanthanoids, which belong to rare-earth elements, causing the rare-earth elements to leach from the bauxite residue, and separating and recovering the rare-earth elements.

2. Description of the Related Art

Rare-earth elements are widely used in applications such as a high strength Al alloy, a phosphor, a magnetic substance, optical glass, and a catalyst. Particularly in the magnetic substance, the use of the rare-earth elements as materials for producing a permanent magnet has been rapidly expanding because a magnet having a large maximum energy product and a large residual magnetic flux density can be obtained by adding the rare-earth elements to transition elements. For example, PTL (Patent Literature) No. 1 (JP 59-046,008 A) discloses materials for producing an Nd—Fe—B-based permanent magnet having an excellent maximum energy product and an excellent residual magnetic flux density. In addition, PTL No. 2 (JP 62-165,305 A) discloses a technology for improving the thermal stability of magnetic characteristics, which is a defect of the Nd—Fe—B-based permanent magnet, by substituting part of Nd with Dy in the permanent magnet.

For example, ores such as monazite, bastnaesite, xenotime, and ion adsorption clay mineral are used as raw materials for such rare-earth elements. The rare-earth elements are caused to leach from any of these ores by using an acidic aqueous solution, for example, an aqueous solution of a mineral acid such as sulfuric acid, and the rare-earth elements are separated and collected from the resultant leachate. However, these ore resources are unevenly distributed on the earth, and the abundance of each element in the rare-earth elements significantly varies for each ore. In particular, there are very few mines in which ores containing heavy rare-earth elements having atomic numbers of 64 to 71 and having high mine profitability can be mined, and it is concerned that the depletion of the resources of Dy, which is in especially high demand, may occur. Further, ores containing Sc alone are not mined as ores with good profitability, and tailings of, for example, U ores, which are raw materials for nuclear fuel, are used only as raw materials for Sc, and hence the production quantity of Sc is remarkably small.

On the other hand, the rare-earth elements are also contained in bauxite, which exists as a resource more abundantly than ores such as monazite, bastnaesite, xenotime, and ion adsorption clay mineral and which is an ore resource of aluminum. It is known that the rare-earth elements are caused to dissolve from bauxite and are then separated and recovered {see, for example, paragraph 0004 in PTL No. 3 (JP 09-176, 757 A) and paragraph 0003 in PTL No. 4 (JP 09-184,028 A)}. Further, it is also known that, when aluminum is produced from bauxite through the steps of a Bayer process and Hall-Héroult process, rare-earth elements are caused to leach with sulfurous acid by using, as a raw material, a bauxite residue produced as a by-product in the Bayer process and are then separated and recovered {PTL No. 5 (U.S. Pat. No. 5,030, 424)}. Further, there is known a technology involving causing Sc and lanthanoids to leach with nitric acid from such bauxite residue and separating and recovering them by an ion exchange method {NPTL (Non-Patent Literature) No. 1 (Ind. Eng. Chem. Res. 41(23), 5794-5801, "Pilot-Plant Investigation of the Leaching Process for the Recovery of Scandium from Red Mud")}.

Bauxite contains aluminum oxide and ferric oxide as its main components. In the Bayer process for separating and collecting an aluminum component in bauxite, which serves as a raw material, from the raw material, aluminum oxide in the bauxite is dissolved as aluminum hydroxide in an alkaline aqueous solution of sodium hydroxide, and the aluminum hydroxide is caused to leach and is separated, thereby collecting the aluminum component in the raw material. Further, a bauxite residue produced as a by-product in this process contains, as a main component, ferric oxide, which does not react with an aqueous solution of sodium hydroxide. When bauxite contains rare-earth elements, the rare-earth elements exist as chemically stable compounds such as oxides or hydroxides in an aqueous solution of sodium hydroxide, and the compounds do not easily react with the aqueous solution of sodium hydroxide even when the aqueous solution is heated and pressurized. Thus, in the bauxite residue, the rare-earth elements are to be concentrated to the extent corresponding to the amount of the aluminum component caused to leach with the aqueous solution of sodium hydroxide in the Bayer process described above.

According to studies of the inventors of the present invention, the bauxite residue contains rare-earth elements about three times on the average in comparison to the content of rare-earth elements in bauxite. Further, the bauxite residue is an industrial waste which is produced as a by-product when aluminum is produced from bauxite, and hence can be easily obtained. Therefore, the bauxite residue is expected to be used as a raw material for rare-earth elements.

However, detailed examination of PTL No. 5 above has revealed that, as described in Examples 1 and 2 thereof, a bauxite residue containing, in dry basis, 52.0% of $Fe_2O_3$, 6.5% of $TiO_2$, 18.0% of L.O.I, 12.9% of $Al_2O_3$, 2.4% of $SiO_2$, 1.6% of $Na_2O$, 5.0% of CaO, and 0.6% of $P_2O_5$ is used as a raw material, and a leaching (or digesting) operation is repeated two or three times between 10 and 70° C. performed for a sulfurous acid solution comprising the raw material and having a high pH value, by using a sulfurous acid solution having a low pH value to adjust the final pH value of the resultant solution to 1.35 to 2.4. Accordingly, rare-earth elements are caused to leach while keeping the dissolution of Fe and Ti contained in the bauxite residue at a low level, and the rare-earth elements are then separated and recovered by using a solvent extraction method. In this case, however, in a leaching time of 20 minutes, which is considered to be preferred to almost saturate the leaching amount of the rare-earth elements without continuously increasing the dissolution amount of Fe, about 65% of the content of Y in the bauxite leaches, while the leaching ratio of Nd is lower than that of Y and is only about 58% (see the descriptions on lines 32 to 36 in column 7, Tables 1 to 3, and FIG. 2 in PTL No. 5).

That is, the technology described in Examples 1 and 2 of the PTL No. 5 involves repeating the leaching operation two or three times, and hence, as the amount of a leachate increases, the cost of leaching treatment increases at the time of causing rare-earth elements to leach from a bauxite residue because, for example, it is required to repeat a solid-liquid separation operation two or three times. Moreover, when the liquid-solid ratios at the time of the leaching operations are compared between Example 1 (see Table 1) and Example 2 (see Table 3), the total leaching ratio of the first and second leaching operations in Example 1 is higher than that in Example 2. Digestion is carried out twice under the leaching conditions of 4:1 and 10:1, and the amount of a leachate becomes 14 times the amount of red mud serving as a raw material. Thus, it is required to use an extractant in a large amount corresponding to the amount of the leachate, the extractant being necessary in separation and recovery treatment for separating and recovering rare-earth elements from the leachate by the solvent extraction method. In addition, an expensive extractant such as EHEHPA is used. Accordingly, this technology has a problem in that the cost of the separation and recovery treatment becomes higher.

By the way, the inventors of the present invention used 0.102 kg of a bauxite residue having the same composition as that of the bauxite residue used in examples to be described below, and followed the experiment in Example 1 of PTL No. 5, which involves using an aqueous solution of sulfurous acid as an acidic aqueous solution and repeating the same extraction operation three times under the conditions of a liquid-solid ratio (L/S) of 5.0, a temperature of 30° C., a pressure of 0.1 MPa, and a time of 15 minutes. The results are as shown in Table 1. In the first leaching operation, the leaching ratio of Y merely reached 5 mass % or less, and the total leaching ratio of Y additionally including the leaching ratios of the second and third leaching operations was 52 mass %. However, the leaching ratios of Nd and Dy merely reached 41 mass % and 43 mass %, respectively, which were merely even lower values in comparison to the leaching ratio of Y.

TABLE 1

| Usage of bauxite residue | | kg | 0.102 |
|---|---|---|---|
| First leaching | Kind of acid | | $H_2SO_3$ |
| | Liquid-solid ratio | | 5.0 |
| | Leaching conditions | Temperature ° C. | 30 |
| | | pH After completion of leaching | 3.27 |
| | | Time Minutes | 15 |
| Second leaching | Kind of acid | | $H_2SO_3$ |
| | Liquid-solid ratio | | 5.0 |
| | Leaching conditions | Temperature ° C. | 30 |
| | | pH Initial stage of leaching | 2.05 |
| | | After completion of leaching | 3.20 |
| | | Time Minutes | 15 |
| Third leaching | Kind of acid | | $H_2SO_3$ |
| | Liquid-solid ratio | | 5.0 |
| | Leaching conditions | Temperature ° C. | 30 |
| | | pH Initial stage of leaching | 1.21 |
| | | After completion of leaching | 1.82 |
| | | Time Minutes | 15 |
| pH value | Initial stage of leaching | | 3.3 |
| | After leaching | | 1.2 |
| Leaching ratio (mass %) | Y | | 52 |
| | Nd | | 41 |
| | Dy | | 43 |
| | Ca | | 88 |
| | Al | | 40 |
| | Si | | 99 |
| | Ti | | 0.3 |
| | Fe | | 0.2 |

Further, NPTL No. 1 shows the leaching ratios of Sc, Y, and Fe resulting from the operation performed under the conditions of using 0.6 N $HNO_3$ and adjusting the pH at the time of completion of leaching to about 0.15 to 0.44. The leaching ratios of Sc and Y sharply lowers as the pH at the time of completion of the leaching becomes higher, and, when the pH at the time of completion of the leaching is adjusted to 0.44, the leaching ratio of Y is about 38% (see FIG. 4). As in the case of PTL No. 5 described above, in NPTL No. 1 as well, it is described that the leaching operation needs to be repeated two or three times in order to increase the leaching ratios and that a liquid-solid ratio of 50 to 100, which is even higher than that in the case of PTL No. 4, is necessary. In addition, it is also described that, because the pH of the leachate is low, the dissolution ratio of Fe is as high as 2 to 4%. When the leaching ratios of impurities such as Fe become higher as described above, some problems occur, for example, it is required to use an extractant in a large amount corresponding to the amount of the leachate, the extractant being necessary in the subsequent steps, as in the case of PTL No. 5 described above.

According to NPTL No. 1, when rare-earth elements including Sc are caused to leach from a bauxite residue serving as a raw material and are recovered, the leaching operation is performed by using 0.6 N nitric acid under the conditions of a solid-liquid ratio (S/L) of 0.1 to 0.01 and a leaching time of 0.5 to 3 hours (see Table 2) because Sc is more difficult to dissolve in acid than lanthanoids. As the solid-liquid ratio (S/L) is smaller and as the leaching time is longer, the leaching ratio of rare-earth elements becomes higher, but, even in the case of run 5, in which the leaching ratio of Nd is high, the leaching ratios of Sc and Nd are 68.0% and 53.8%, respectively (see Table 3). Thus, NPTL No. 1 involves disadvantages such as the fact that the leaching ratio of Nd is not sufficiently high, the fact that the amount of Fe in the leachate in that case is $146.0 \times 10^3$ mg, which is equivalent to 100 times or more the amount of rare-earth elements, and the fact that the solid-liquid ratio needs to be adjusted to 0.01.

LIST FOR LITERATURES OF PRIOR ART

Patent Literature (PTL)

[PTL No. 1] JP 59-046,008 A
[PTL No. 2] JP 62-165,305 A
[PTL No. 3] JP 09-176,757 A
[PTL No. 4] JP 09-184,028 A
[PTL No. 5] U.S. Pat. No. 5,030,424

Non-Patent Literature (NPTL)

[NPTL No. 1] Ind. Eng. Chem. Res. 41(23), 5794-5801, "Pilot-Plant Investigation of the Leaching Process for the Recovery of Scandium from Red Mud"

SUMMARY OF THE INVENTION

In view of the foregoing, the inventors of the present invention have first made studies on how to improve the leaching ratios of rare-earth elements when the rare-earth elements are caused to leach from a bauxite residue. As a result, the inventors have found that, when a mineral acid such as sulfuric acid, hydrochloric acid, nitric acid, or sulfurous acid is used as an acid for causing rare-earth elements to leach from a bauxite residue, the leaching ratios of the rare-earth elements improves. Further, the inventors have found that, in the case of using such mineral acid, when the pH reaches less than 0.5, the leaching ratios of Fe and Al, which are impurities, also become higher, and for example, the amount of a pH adjuster necessary for adjusting the pH in a step after the leaching is increased, resulting in an increased cost.

Next, the inventors of the present invention have made additional studies on the causes for the reduction of the leaching ratios of rare-earth elements, in particular, Sc, Nd, and Dy, the reduction occurring when the pH of a leaching solution is increased to as high as 0.44 in NPTL No. 1 described above, and have found the following finding.

That is, when a bauxite residue produced as a by-product in a Bayer process is observed in detail, as evident from the photograph of FIG. 1 taken when the bauxite residue is observed with an optical microscope and the photograph of FIG. 2 taken when the bauxite residue is observed with a scanning electron microscope, there are observed, in the bauxite residue, fine powder-like crystalline particles and/or porous particles and aggregates thereof (hereinafter simply referred to as "fine particles"), coarse crystalline particles each having a diameter of 50 to 1,000 µm (hereinafter referred to as "coarse particles") and dense crystalline particles each of which has a polygonal shape and is relatively large (hereinafter referred to as "crystal particles"). Further, the fine particles usually have a specific surface area of about 35 $m^2/g$ or more, the coarse particles are crystalline oxides such as diaspore, boehmite, quartz, rutile, hematite, and goethite, and the crystal particles are crystalline oxides containing Ca, Ti, Fe, or O, which are newly produced in the Bayer process, such as calcium titanate, calcium aluminate, and sodalite each having a perovskite (ABX3)-type structure, though these conditions of the particles may vary depending on bauxite ores, mining thereof, pretreatment methods such as heating and drying, the conditions of the pretreatment methods, the leaching conditions of an aluminum component in the Bayer process, etc.

Here, bauxite contains aluminum oxide and ferric oxide as its main components as described above, and it is considered that bauxite was produced after igneous rock such as granite and lime stone had undergone weathering. That is, igneous rock, such as granite, which contains aluminosilicate minerals (feldspars) as its main component, and lime stone, which contains calcium carbonate (calcite) as its main component, have been exposed to the environment of high temperature and abundant rainfall, alkali metal components, calcium components, silicon oxide, and the like among the main components are dissolved, and the remaining aluminum oxide and ferric oxide constitute the main components of bauxite. Thus, when igneous rock such as granite and lime stone each containing rare-earth elements are exposed to the environment of high temperature and abundant rainfall under a state of being kept under an alkaline atmosphere, the rare-earth elements are concentrated to the extent corresponding to the dissolved amounts of the alkali metal components, calcium components, silicon oxide, and the like as described above and are included in the resultant bauxite. In fact, according to the studies made by the inventors of the present invention, the concentration of rare-earth elements in bauxite is about ten times higher than that of rare-earth elements in igneous rock such as granite and lime stone before weathering.

In addition, the coarse particles in the bauxite residue mainly include coarse particles which have not changed in the Bayer process and calcium aluminate and sodalite which are produced in the Bayer process, and rare-earth elements in bauxite are not concentrated therein. On the other hand, rare-earth elements are concentrated at a relatively high concentration in the fine particles in the bauxite residue, and rare-earth elements are also taken into the crystal particles such as calcium titanate, which have a perovskite-type structure and are newly produced in the Bayer process. Further, the ratio the fine particles to the crystal particles newly produced in the bauxite residue significantly fluctuates depending on the amount of titanium oxide in bauxite, the operation conditions, in particular, the treatment temperature, in the Bayer process, and the addition amount of CaO, which is added for the purpose of removing impurities such as Si and P. When the treatment temperature in the Bayer process is adjusted to less than 160° C., few crystal particles are newly produced, and hence rare-earth elements are consequently contained in the fine particles, and the rare-earth elements contained in such fine particles can be caused to leach efficiently. This is probably because the fine particles have a high specific surface area and have a large area for reaction with a liquid leaching agent, and, in addition, the newly produced crystal particles are, for example, calcium titanate ($CaTi(Fe)O_3$), which has a chemically-stable perovskite (ABX3)-type structure, and hence are difficult to dissolve in a mineral acid. Even if the treatment temperature in the Bayer process is 160° C. or more, when the content of CaO in the bauxite residue is less than 4 mass %, few crystal particles are produced in the Bayer process, and hence rare-earth elements can be caused to leach efficiently. However, when the treatment temperature in the Bayer process is 230° C. or more, crystal particles are produced, and the crystal structure of fine particles, which are mainly constituted by $Fe_2O_3$, changes from an incomplete structure to a nearly complete structure, with the result that the specific surface area of the fine particles reduces and the leaching of rare-earth elements becomes difficult. Thus, when the treatment condition in the Bayer process is 230° C. or more, it is difficult to cause rare-earth elements to leach.

As a result of the above studies, the inventors of the present invention have found that, when a bauxite residue produced in the Bayer process by using bauxite having a specific surface area of 26 $m^2/g$ or more as a raw material and treating the bauxite under the condition of a temperature of 160° C. or less is used as a raw material bauxite residue, when a bauxite residue which is produced in the Bayer process by using bauxite having a specific surface area of 26 $m^2/g$ or more as a raw material and treating the bauxite under the condition of a temperature of less than 230° C. and which contains CaO at less than 4 mass %, is used as a raw material bauxite residue, or when a fraction with a high specific surface area provided by applying fractionation treatment to a bauxite residue including fine particles, coarse particles, and crystal particles is used as a raw material bauxite residue, rare-earth elements can be recovered efficiently from the raw material bauxite residue by using a liquid leaching agent with a pH of 0.5 to 2.2 which is capable of suppressing the leaching ratios of the impurities Fe and Al. As a result, the inventors of the present invention have completed the present invention.

Thus, an object of the present invention is to provide a method of recovering rare-earth elements by which rare-earth elements can be recovered efficiently from a bauxite residue containing the rare-earth elements, which is used as a raw material.

That is, according to the present invention, there is provided a method of recovering rare-earth elements from a raw material, the raw material being a bauxite residue produced as a by-product in a Bayer process for separating and collecting an aluminum component from bauxite, the method including: using, as the raw material, a bauxite residue having a specific surface area of 35 $m^2/g$ or more; adding, to the raw material bauxite residue, a liquid leaching agent formed of an aqueous solution of at least one kind of mineral acid selected from sulfuric acid, hydrochloric acid, nitric acid, and sulfurous acid, thereby preparing a slurry having a liquid-solid ratio of 2 to 30 and a pH of 0.5 to 2.2; subjecting the slurry to leaching treatment of the rare-earth elements under a temperature condition of room temperature to 160° C.; subjecting the slurry after the leaching treatment to solid-liquid separation, yielding a leachate; and separating and recovering the rare-earth elements from the leachate.

Further, according to the present invention, in the method of recovering rare-earth elements, the raw material bauxite residue includes a bauxite residue provided in a Bayer process including using, as a raw material, bauxite having a specific surface area of 26 m$^2$/g or more and treating the bauxite under a condition of a temperature of less than 160° C. Further, in the method of recovering rare-earth elements, the raw material bauxite residue includes a bauxite residue provided in a Bayer process including using, as a raw material, bauxite having a specific surface area of 26 m$^2$/g or more and treating the bauxite under a condition of a temperature of less than 230° C., the bauxite residue containing CaO at less than 4 mass %. In addition, in the method of recovering rare-earth elements, the raw material bauxite residue includes a high specific surface area fraction mainly including fine particles having a specific surface area of 35 m$^2$/g or more, the high specific surface area fraction being provided by applying fractionation treatment to a bauxite residue.

Note that, in the method of the present invention, the term "rare-earth elements" is used to refer collectively to Sc with an atomic number of 21, Y with an atomic number of 39, and La to Lu with atomic numbers of 57 to 71 (hereinafter referred to as "lanthanoids"), but this does not deny the possibility that Ac to Lr with atomic numbers of 89 to 103 are caused to leach, and is separated and recovered by the method of the present invention.

Here, the particle size distribution of a bauxite residue produced in the Bayer process is generally, as shown in FIG. 3, 86 to 93 mass % with respect to particles each having a size of 38 μm or less, 2 to 4 mass % with respect to particles each having a size of 38 to 75 μm, 1 to 4 mass % with respect to particles each having a size of 75 to 300 μm, and 3 to 6 mass % with respect to particles each having a size of 300 μm or more. Then, examination of particle size distribution has been conducted on the raw material bauxite residue according to the method of the present invention, which is provided in the Bayer process including using, as a raw material, bauxite having a specific surface area of 26 m$^2$/g or more and treating the bauxite under the condition of a temperature of 160° C. or less, and on the raw material bauxite residue according to the method of the present invention, which is provided in the Bayer process including using, as a raw material, bauxite having a specific surface area of 26 m$^2$/g or more and treating the bauxite under the conditions of a temperature of less than 230° C. and an addition amount of CaO of less than 4 mass %. The thin line hatching of FIG. 3 shows fine particles having a specific surface area of 51.5 m$^2$/g, and the thick line hatching of FIG. 3 shows fine particles having a high specific surface area of 40.7 m$^2$/g. When the method of the present invention is employed by using one of these raw material bauxite residues, rare-earth elements can be recovered at a high leaching ratio. On the other hand, the dot hatching of FIG. 3 shows a bauxite residue containing particles having a specific surface area of 17.9 m$^2$/g, and even if rare-earth elements are recovered from the bauxite residue by the method of the present invention, high leaching ratio cannot be achieved.

Further, it is possible to exemplify, as a method for selectively obtaining a raw material bauxite residue formed of a high specific surface area fraction mainly including fine particles and having a specific surface area of 35 m$^2$/g or more by fractionation treatment from a bauxite residue in which fine particles having a relatively high specific surface area and coarse particles having a relatively low specific surface area are mixed and which has a specific surface area of less than 35 m$^2$/g, for example, a method in which classification is performed by using a sieve having a mesh size of 38 to 400 μm, preferably a sieve having a mesh size of 38 to 300 μm. The classification performed by using a sieve having a mesh size of 38 to 400 μm may be wet treatment or dry treatment, and can yield a high specific surface area fraction which is suitable as a raw material bauxite residue of the present invention. When this fractionation treatment is performed, it is possible to remove coarse particles derived from bauxite used as a raw material and also crystal particles each having a larger size among crystal particles produced in the Bayer process. Thus, when many coarse crystal particles of calcium aluminate and sodalite are included in a bauxite residue and neutralization treatment to be described later is carried out, the amount of a mineral acid aqueous solution used in the neutralization treatment can be suppressed.

Note that, when a bauxite residue which is produced as a by-product in the Bayer process and is known to include many particles having a high specific surface area is used as a raw material, the above-mentioned fractionation treatment can be skipped. Moreover, if it is possible to selectively separate particles having a specific surface area of 35 m$^2$/g or more in a bauxite residue produced as a by-product in a Bayer process by using a method other than the fractionation treatment, it should be understood that the method may be adopted.

Further, in the method of the present invention, the content of rare-earth elements in the raw material bauxite residue is not particularly limited, but it is desired from the viewpoint of improving leaching efficiency in leaching treatment that oxides of Sc, Y, and lanthanoids be contained at a total ratio of 1,500 to 10,000 ppm in a solid component prepared by drying the raw material bauxite residue under drying conditions of preferably 110° C. and 2 hours. When the total content of these rare-earth elements is less than 1,500 ppm, the small content may cause the reduction of the profitability.

Further, in the present invention, it is preferred that a raw material bauxite residue contain Ca in terms of CaO at less than 4 mass %. This is probably because, when a raw material bauxite residue contains Ca in terms of CaO at 4 mass % or more, as described above, crystal of calcium titanate (CaTi(Fe)O$_3$), which has a perovskite (ABX3)-type structure and is difficult to dissolve in a mineral acid, is formed at 160° C. or more in a newly produced crystal particles, and because, after aluminum oxide is separated in the above-mentioned Bayer process, a coating layer of Ca compounds is easily formed on the surfaces of remaining particles having a large specific surface area, and the coating layer of Ca compounds prevents rare-earth elements from leaching.

According to the method of the present invention, rare-earth elements, in particular, Sc, Y, and lanthanoids, can be separated and recovered easily at a high leaching ratio by using a raw material bauxite residue having a particular specific surface area as a raw material. Consequently, resources in a bauxite residue can be utilized effectively, and it is possible to eliminate many concerns such as the uneven distribution of raw material ores for rare-earth elements, the variation in the abundance of each rare-earth element for each ore, and the depletion of the resources of rare-earth elements.

BRIEF DESCRIPTION OF THE DRAWINGS

The patent or application file contains at least one color drawing. Copies of this patent or patent application publication with color drawing will be provided by the USPTO upon request and payment of the necessary fee.

In the accompanying drawings.

DETAILED DESCRIPTION OF THE PREFERRED EMBODIMENTS

Figure 1:
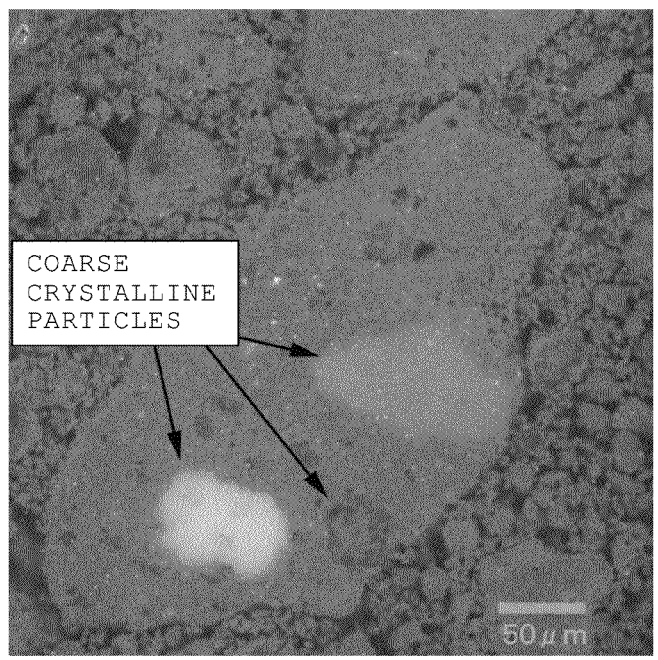
FIG. 1 is an observation photograph which was taken when a bauxite residue produced as a by-product in a Bayer process was observed with an optical microscope (The arrows in FIG. 1 show coarse crystalline particles.)
Figure 2:
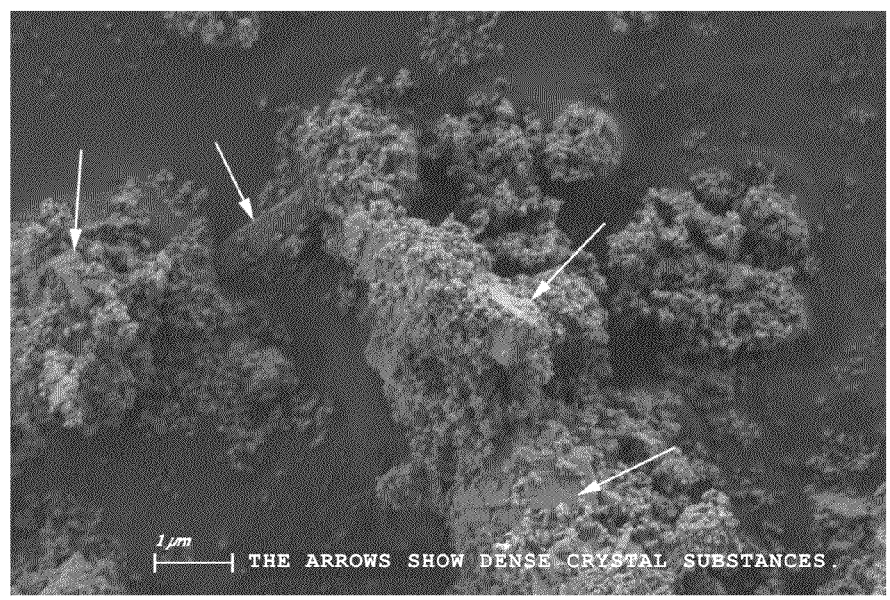
FIG. 2 is an observation photograph which was taken when the bauxite residue produced as a by-product in the Bayer process was observed with a scanning electron microscope (The arrows in FIG. 2 show dense crystal substances.)
Figure 3:
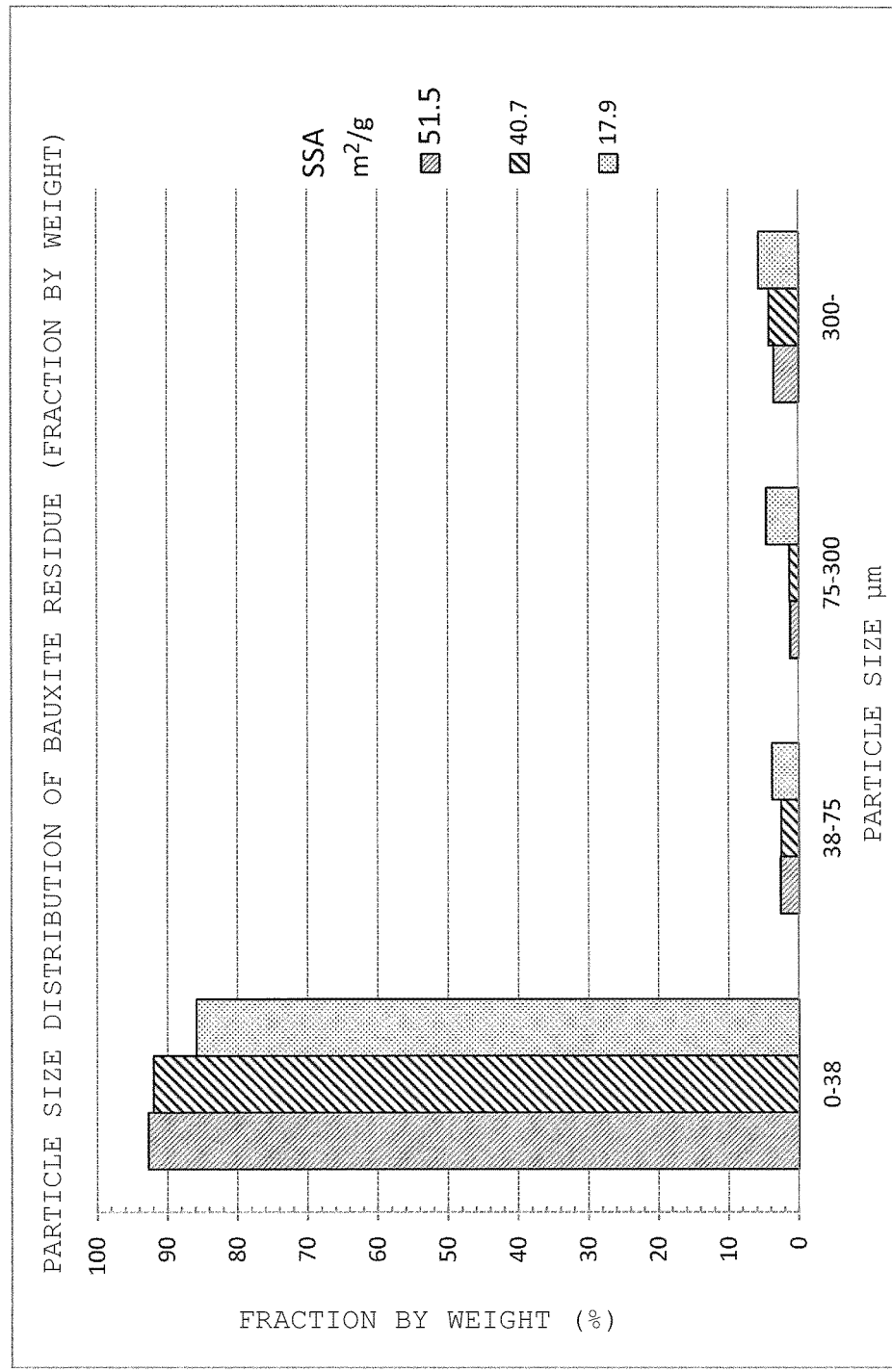
FIG. 3 is a graph chart showing the particle size distribution of a bauxite residue yielded in the Bayer process.

Hereinafter, embodiments of the present invention are specifically described.

First, a raw material bauxite residue mainly including fine particles having a specific surface area of 35 m$^2$/g or more is recovered in a Bayer process involving using, as a raw material, bauxite having a specific surface area of 26 m$^2$/g or more and treating the raw material under the condition of a temperature of less than 160° C., or a raw material bauxite residue which mainly includes fine particles containing CaO at less than 4 mass % and having a specific surface area of 35 m$^2$/g or more is recovered in a Bayer process involving treating the raw material under the condition of a temperature of 230° C. Alternatively, a raw material bauxite residue formed of a high specific surface area fraction, which mainly includes fine particles and has a specific surface area of 35 m$^2$/g or more, is recovered by fractionation treatment from a bauxite residue in which fine particles having a relatively high specific surface area and coarse particles having a relatively low specific surface area are mixed and which has a specific surface area of less than 35 m$^2$/g.

Subsequently, a liquid leaching agent formed of a predetermined mineral acid aqueous solution is added to the raw material bauxite residue, followed by mixing so that a slurry having a predetermined pH at a predetermined liquid-solid ratio is prepared, and leaching treatment is performed at a predetermined temperature. When the slurry is prepared, one kind selected from sulfuric acid, hydrochloric acid, nitric acid, and sulfurous acid can be used alone as the mineral acid or two or more kinds selected there from can be used in combination. Further, the ratio of a liquid component (L) to a solid component (S) in the prepared slurry, that is, the liquid-solid ratio (L/S), is 2 or more and 30 or less, preferably 4 or more and 10 or less. When the liquid-solid ratio (L/S) of the slurry is less than 2, the viscosity of the slurry becomes higher and the slurry is difficult to handle in the subsequent solid-liquid separation treatment, with the result that the recovery ratio of the resultant leachate lowers. On the other hand, even if the liquid-solid ratio (L/S) of the slurry is more than 30, not only the leaching ratios of rare-earth elements is saturated and does not improve, but also the amount of water used increases and the amount of the resultant leachate increases. As a result, a larger apparatus needs to be used at the time of performing solid-liquid separation for obtaining a leachate after leaching treatment and performing separation and recovery for recovering rare-earth elements from the leachate. In addition, another disadvantage is an increased cost because a larger apparatus needs to be used, larger amounts of chemicals need to be used, and more wastes need to be disposed of.

Further, the pH value of the slurry in the leaching treatment is 0.5 to 2.2, preferably 0.7 to 2.0. When the pH value of the slurry is more than 2.2, the leaching ratios of rare-earth elements lowers and is not sufficient. On the other hand, when the pH value of the slurry is less than 0.5, increased amounts of Al, Fe, and Ti during the leaching treatment make the separation of rare-earth elements difficult, and the consumptions of the mineral acid and a pH adjuster to be described below become larger, resulting in an increased cost for recovering rare-earth elements. When sulfuric acid is used as the liquid leaching agent, the leaching ratios of Y and lanthanoids are high soon after the start of leaching but lower with time. This is because, when calcium sulfate produced by leaching is saturated and starts precipitating in the leachate, those rare-earth elements which are caused to leach soon after the start of the leaching are coprecipitated together with the calcium sulfate. When the leaching is continued, the rare-earth elements which are initially coprecipitated together with the calcium sulfate dissolve again, and hence the leaching ratios of the rare-earth elements initially reaches the minimum value but rises again later.

The slurry in the leaching treatment may be prepared by adding water to the raw material bauxite residue, followed by mixing, then adding the mineral acid is added to the mixture, and adjusting the pH to a predetermined value while mixing the whole. Alternatively, the slurry may be prepared by adding a predetermined amount of the mineral acid to the raw material bauxite residue, followed by mixing, then adding water to the mixture, and mixing the whole. The slurry is preferably prepared by preparing a mineral acid aqueous solution having a predetermined concentration in advance as a liquid leaching agent in a predetermined amount so that a predetermined liquid-solid ratio (L/S) and a predetermined pH value can be achieved, adding the liquid leaching agent to the raw material bauxite residue, and mixing the whole. According to such method, the liquid-solid ratio (L/S) and pH value of the prepared slurry can be easily adjusted to desired values, and hence it is possible to obviate, for example, the dissolution of impurities such as Fe into a leachate due to a local high concentration of the mineral acid.

It is preferred to remove, prior to the leaching treatment, elements such as Al, Si, and Ca, which dissolve owing to the decomposition of calcium aluminate and sodalite among crystal particles produced in a Bayer process. Then, it is preferred to apply, prior to the leaching treatment, neutralization treatment to the raw material bauxite residue at a pH of from 3.5 to 5, at which rare-earth elements do not dissolve. This neutralization treatment facilitates the subsequent separation and recovery of rare-earth elements from the leachate. Further, it is suitable to use an aqueous solution of sulfurous acid, which dissolves Ca at a high ratio, as a mineral acid aqueous solution to be used in the neutralization treatment, but it is also possible to use waste acid which is exhausted when the separation and recovery of rare-earth elements to be described below is carried out.

Further, it is desirable to add, prior to the leaching treatment, an oxidizing agent at an equivalent weight of 0.1 or more and 0.3 or less, preferably at an equivalent weight of 0.15 or more and 0.25 or less, with respect to the Fe components in the raw material bauxite residue. With this, $Fe^{2+}$ ions which are derived from a component in the raw material bauxite residue and contained in the slurry are converted to $Fe^{3+}$ ions, and Fe and Al are precipitated during the subsequent separation and recovery of rare-earth elements, thereby facilitating the separation and recovery treatment of the rare-earth elements. The oxidizing agent to be added for this purpose may be preferably exemplified by a hydrogen peroxide solution and a perchloric acid aqueous solution, more preferably a 30-mass % hydrogen peroxide solution and a 70-mass % perchloric acid aqueous solution. When the addition amount of the oxidizing agent is less than 0.1 equivalent weight, $Fe^{2+}$ ions remain in the leachate even in the state of a high pH. In contrast, even if the addition amount of the oxidizing agent is more than 0.3 equivalent weight, the effect of the oxidizing agent remains unchanged, and hence the oxidizing agent excessively added is used wastefully.

Further, the treatment temperature at which the leaching treatment is performed falls within the range of room temperature (20° C.) or more and 160° C. or less, preferably 50° C. or more and 105° C. or less. As the treatment temperature is higher, the leaching ratios of rare-earth elements tend to be higher. However, the treatment temperature is desirably selected and determined in consideration of a balance among energy cost, the kinds and leaching ratios of rare-earth elements to be recovered, etc. For example, when the leaching ratios in Examples 5 to 11 to be described below are referred to (see Table 4), the leaching ratio of Sc lowers from 36 mass % at 100° C. to 11.2 mass % to 28.8 mass % at 25° C., the leaching ratio of Y lowers from 61.5 mass % at 100° C. to 41.9 mass % to 53.3 mass % at 25° C., the leaching ratio of La belonging to lanthanoids lowers from 89.6 mass % at 100° C. to 63.5 mass % to 79.8 mass % at 25° C., the leaching ratio of Nd belonging to lanthanoids lowers from 82.2 mass % at 100° C. to 66.9 mass % to 77.1 mass % at 25° C., and the leaching ratio of Dy belonging to lanthanoids lowers from 69.1 mass % at 100° C. to 50.8 mass % to 68.7 mass % at 25° C. Further, when the treatment temperature is more than 160° C., the leaching ratio of Sc is maintained at a high value, but the leaching ratios of other elements belonging to the rare-earth elements significantly lower.

The holding time for which the slurry is held at the temperature described above in the leaching treatment is 1 second or more and 180 hours or less. The holding time is preferably 30 minutes or more and 180 hours or less for the leaching of Sc, and is preferably 1 second or more and 7 minutes or less for the leaching of lanthanoids. It is preferred to agitate the slurry during the leaching treatment because leaching ratios with smaller variations are obtained. When the holding time is less than 1 second, the problem of leaching ratios with larger variations occurs. Further, when lanthanoids are caused to leach, it is also suitable that the slurry be held for 1 second or more and 7 minutes or less and immediately after that, the slurry be diluted and cooled with water having a temperature of 50° C. or less in an amount equal to or larger than the amount of the slurry. With this, it is possible to control easily the holding time for which the slurry is held at the leaching temperature described above in the leaching treatment. Alternatively, it is possible to cause lanthanoids to leach during a holding time of 1 second or more and 7 minutes or less and are recovered, and then cause Sc to leach during a holding time of 30 minutes or more and 180 hours or less, thereby causing both Sc and lanthanoids to leach efficiently and recovering them.

The pH of the slurry after the leaching treatment is adjusted to 2.5 to 6 by such a pH adjustment method as described below, and hydroxides of Fe and Al precipitated by this pH adjustment are removed through solid-liquid separation, thereby reducing the concentrations of the impurities Fe and Al. Consequently, the purity of the rare-earth elements can be increased. A pH adjuster to be used for this purpose is not particularly limited, and sodium hydroxide, potassium hydroxide, calcium hydroxide, ammonia, a bauxite residue, or the like is suitably used. When a raw material bauxite residue is used as the pH adjuster, another pH adjuster necessary for pH adjustment is saved, and additional rare-earth elements are caused to leach from the added bauxite residue, and hence the concentration of the rare-earth elements becomes higher and the amount of the mineral acid to be used for the leaching treatment can also be saved. Further, the solid-liquid separation treatment in which hydroxides of Fe and Al precipitated by pH adjustment and a bauxite residue are separated from a leachate has only to be performed once, thus the number of solid-liquid separation steps can be reduced.

The slurry after the leaching treatment is then subjected to solid-liquid separation by means selected from, for example, filtration, centrifugal separation, precipitation separation, and decantation, and a leachate including rare-earth elements is recovered. It is preferred that the solid residue yielded by the solid-liquid separation be washed with washing water so that the leachate attached to the solid residue is washed out, the leachate be transferred into water and recovered, and both the recovered leachate and the leachate previously yielded by the solid-liquid separation be used as a leachate for the subsequent separation and recovery of rare-earth elements. When the amount of the washing water to be used for washing the solid residue is too small, the leachate attached to the solid residue cannot be recovered sufficiently. In contrast, when the amount of the washing water to be used is too large, a larger burden is applied to the subsequent separation and recovery treatment of rare-earth elements. Thus, the ratio of the washing water (L) to the solid residue (S), that is, the liquid-solid ratio (L/S), desirably falls within the range of 2 to 30 in ordinary cases.

The leachate yielded by the above-mentioned solid-liquid separation treatment is then transferred to the stage of the separation and recovery of rare-earth elements for separating and recovering rare-earth elements which include Sc, Y, and lanthanoids. In the stage of the separation and recovery, the treatment of rare-earth elements from the leachate can be carried out by a known method, and there is used, as a separation method, a hydroxide precipitation method, an oxalate precipitation method, a carbonate precipitation method, a solvent extraction method, an ion exchange method, or the like. In the present invention, in which the dissolution amounts of Fe and Ti are small, the leachate can be directly treated by an oxalate precipitation method or a solvent extraction method. However, in that case, the dissolution amount of at least one of Al and Fe becomes larger under the conditions of a low pH and a high temperature in leaching treatment, and the amounts of chemicals used in the oxalate precipitation method or the solvent extraction method increase. Therefore, it is preferred to decrease the concentrations of Al and Fe in the leachate and to perform pretreatment for concentrating the leachate in order to reduce the cost.

The pretreatment for concentrating the leachate may also be performed by any one of the known methods, which include a method involving concentrating a leachate yielded by solid-liquid separation treatment by evaporation, a concentration method involving using a reverse osmosis membrane concentration apparatus, and a method involving extracting rare-earth elements including impurity elements with a solvent by circulating the solvent and separating an aqueous phase containing part of impurities while concentrating the extract.

As a treatment method to be carried out after the amount of the leachate is reduced to about ⅕ to ¹⁄₁₀₀ by such concentration treatment as described above, there are given a method involving extracting and separating rare-earth elements which include Sc, Y, and lanthanoids by a solvent extraction method and simultaneously concentrating the extract, a method involving subjecting rare-earth elements to solid-liquid separation by, for example, a hydroxide precipitation method, an oxalate precipitation method, or a carbonate precipitation method so as to yield solid rare-earth hydroxides, solid rare-earth oxalates, or solid rare-earth carbonates as solid rare-earth compounds, and a method (pH adjustment method) involving, in order to reduce the amount of chemicals used in the above-mentioned method, combining therewith a method involving removing hydroxides of Fe and Al in advance from a leachate by solid-liquid separation after adjusting the pH of the leachate.

Among those methods, in the pH adjustment method involving combining another method, a pH adjuster is first added to a leachate usually having a pH value of from 1 to 3 so as to adjust the pH value to 4 to 6, and hydroxides of Fe and Al precipitated by this pH adjustment are removed by solid-liquid separation so as to reduce the concentrations of the impurities Fe and Al. By adopting this method, the purity of the rare-earth compounds can be increased. The pH adjuster to be used for this purpose is not particularly limited, and sodium hydroxide, potassium hydroxide, calcium hydroxide, ammonia, a bauxite residue, or the like is suitably used. When the partial purification and concentration of rare-earth elements described above are performed, there is provided a leachate having a high concentration of rare-earth elements or solid rare-earth compounds.

When the pH adjustment of the leachate is performed, an oxidizing agent is desirably added as required, thereby oxidizing $Fe^{2+}$ ions into $Fe^{3+}$ ions in the leachate. With this, insoluble $Fe(OH)_3$ is stabilized, which facilitates the separation and removal of Fe. It is possible to use suitably, as the oxidizing agent, for example, air blowing, hydrogen peroxide, perchloric acid, permanganic acid, hypochlorous acid, or the like. When hydrogen peroxide is used as the oxidizing agent, the concentration of the oxidizing agent influences only the liquid-solid ratio, and hence a proper concentration can be selected in consideration of the ease of handling and the cost. In both the case of using a 30-mass % hydrogen peroxide solution and the case of using a 70-mass % perchloric acid aqueous solution, the addition amount of the oxidizing agent is preferably 0.1 to 0.5 equivalent weight with respect to the amount of Fe components in the bauxite residue.

Next, the hydroxide precipitation method is described. In the hydroxide precipitation method, in order to separate rare-earth elements which include Sc, Y, and lanthanoids as their hydroxides from a leachate, a pH adjuster is added to a leachate yielded by performing the above-mentioned solid-liquid separation treatment or a liquid yielded by adjusting the pH of the leachate to cause Fe and Al to precipitate as their hydroxides, followed by solid-liquid separation, thereby adjusting the pH value of the leachate to 7 or more, the rare-earth elements are caused to precipitate as their hydroxides, and these rare-earth hydroxides are subjected to solid-liquid separation and recovered as a crude recovered product. The pH adjuster is preferably sodium hydroxide, potassium hydroxide, calcium hydroxide, ammonia, or the like, and the rare-earth elements are precipitated as their hydroxides. The precipitated hydroxides are subjected to solid-liquid separation, thereby recovering the rare-earth hydroxides. Alternatively, it is preferred that, for the purpose of reducing the concentration of Al, which is an impurity, a sodium hydroxide solution be added to the precipitated rare-earth hydroxides at 5 or more equivalent weights with respect to the Al, thereby causing the Al to dissolve as aluminate ions and removing the Al.

In the oxalate precipitation method, oxalic acid is added to a leachate yielded by performing the above-mentioned solid-liquid separation treatment or a liquid yielded by adjusting the pH of the leachate to cause Fe and Al to precipitate as their hydroxides, followed by solid-liquid separation, at an equal or more equivalent weight, preferably at 1.3 to 6 equivalent weights, with respect to the total number of moles of the rare-earth elements existing in the leachate or the liquid, yielding insoluble rare-earth oxalates, and solid-liquid separation is then performed, thereby recovering the rare-earth oxalate compounds as crude rare-earth compounds (crude recovered product).

In the carbonate precipitation method, carbonic acid or sodium carbonate is added as a pH adjuster to a leachate yielded by performing the above-mentioned solid-liquid separation treatment, thereby adjusting the pH of the leachate to 4 to 5, rare-earth elements are caused to precipitate as their carbonates, and solid-liquid separation is then performed, thereby recovering the carbonates as a crude recovered product including the rare-earth elements.

When crude rare-earth compounds (crude recovered product) are recovered by a solvent extraction method from a leachate yielded by performing the above-mentioned solid-liquid separation treatment or a liquid yielded by adjusting the pH of the leachate to cause Fe and Al to precipitate as their hydroxides, followed by solid-liquid separation, the solvent extraction method may be performed by a known method. It is possible to use suitably an extractant prepared by diluting an ester such as a phosphoric acid ester (DEHPA or EHPA), a phosphonic acid ester (PC88A), or a phosphinic acid ester (Cyanex 272 or Cyanex 30) with a solvent such as an aliphatic hydrocarbon such as hexane, which is a non-polar organic solvent, an aromatic hydrocarbon such as benzene or toluene, an alcohol such as octanol, or kerosene, which is a petroleum fraction.

It is also preferred to carry out the recovery of a crude recovered product by a solvent extraction method through two or more stages. When a crude recovered product is recovered by the solvent extraction method through two or more stages, rare-earth elements can be separated into each element.

When a solid residue (bauxite residue) remaining after aluminum hydroxide is caused to dissolve from bauxite by a Bayer process is used as a raw material for leaching and crude rare-earth compounds (crude recovered product) are recovered by a solvent extraction method from a leachate yielded by performing the above-mentioned solid-liquid separation treatment, it is preferred that the pH of the leachate be initially adjusted to 2.5 to 3.5, the resultant precipitate be removed, and solvent extraction be performed or the pH of the leachate be re-adjusted to 1.2 to 2.5, followed by solvent extraction. When the pH is adjusted and the precipitate is removed as described above, it is possible to prevent the occurrence of an emulsion or a suspension (hereinafter referred to as "emulsion") produced, for example, between the organic phase and aqueous phase at the time of the solvent extraction. When the emulsion occurs, the resultant precipitate can be removed by filtration. It is not preferred that the pH of the aqueous phase be less than 1.2 at the time of solvent extraction because the recovery ratios of rare-earth elements lowers.

It is also suitable to add a bauxite residue to perform such pH adjustment as described above. When pH adjustment is performed by addition of a bauxite residue, the amount of alkaline chemicals used can be suppressed, and, because the bauxite residue is produced as a by-product in a Bayer process for producing aluminum from bauxite, the cost can be reduced as a result. Further, when pH adjustment is performed by addition of a bauxite residue, rare-earth elements contained in the added bauxite residue leach in the leachate, and hence the acidic aqueous solution used in the leaching treatment can be effectively used, and the rare-earth elements that leach from the added bauxite residue can be recovered. Moreover, in this case, Ca and Ti coprecipitate with Fe, the concentrations of these elements in the leachate lower, and the rare-earth elements can be efficiently recovered as a result.

Further, in such case, it is preferred that DEHPA (chemical name: bis(2-ethylhexyl) hydrogen phosphate) be used in an extractant and diluted with a solvent so as to have a concentration of 0.1 to 1.5 M because the extraction ratio of Al can be kept low, and the concentration of rare-earth elements separated and recovered can be increased as a result. The extraction time is preferably 5 minutes or less, more preferably 0.5 to 3 minutes. When the extraction time is 0.5 to 3 minutes, the extraction ratio of Al can be kept low, and the concentration of rare-earth elements separated and recovered can be increased as a result. When the extraction time is more than 5 minutes, the extraction ratio of Al becomes high, and the concentration of rare-earth elements separated and recovered reduces as a result.

When DEHPA is used in an extractant, it is also suitable that pre-extraction be preliminarily performed by using PC88A (chemical name: mono-2-ethylhexyl 2-ethylhexyl phosphonate), tributyl phosphate, or naphthenic acid as a pre-extractant. When such pre-extraction is performed, the concentrations of elements such as Fe, Sc, and Ti contained in the leachate can be reduced, and rare-earth elements which include Y and lanthanoids can be efficiently separated and recovered as a result. In this case, Sc is separated into the pre-extracted organic phase, but, when back extraction is performed by using an alkaline aqueous solution having a pH of 7.5 or more as a back extractant, Sc can be recovered as a solid hydroxide from the pre-extracted organic phase. In this case, Fe and Ti have already been removed, and hence pH adjustment is not required when rare-earth elements are extracted by using DEHPA. In this case, however, emulsion sometimes occurs between the organic phase and aqueous phase at the time of solvent extraction. When the emulsion occurs, the resultant precipitate can be removed by filtration.

When the back extraction is performed, it is preferred to use a 2 N to 8 N aqueous solution of hydrochloric acid or an aqueous solution of sulfuric acid having a concentration of 30 to 70 mass % as the back extractant.

When the 2 N to 8 N aqueous solution of hydrochloric acid is used as the back extractant, the back extraction time is preferably 5 minutes or less, more preferably 0.5 to 3 minutes. When the back extraction time is 0.5 to 3 minutes, the extraction ratio of Al can be kept low, and the concentration of rare-earth elements separated and recovered can be increased as a result. When the back extraction time is more than 5 minutes, the extraction ratio of Al becomes high, and the concentration of rare-earth elements separated and recovered reduces as a result.

On the other hand, when the aqueous solution of sulfuric acid having a concentration of 30 to 70 mass % is used as the back extractant, rare-earth elements are precipitated as solid sulfates, and thus can be extremely reduced in volume. The back extraction time is preferably 5 minutes or less, more preferably 0.5 to 3 minutes. When the back extraction time is 0.5 to 3 minutes, the extraction ratio of Al can be kept low, and the concentration of rare-earth elements separated and recovered can be increased as a result. When the back extraction time is more than 5 minutes, the extraction ratio of Al becomes high, and the concentration of rare-earth elements separated and recovered reduces as a result. The rare-earth elements precipitated as solid sulfates can be recovered by performing solid-liquid separation. Note that, after the rare-earth elements are recovered, the resultant organic phase can be subjected to back extraction for 120 minutes or more by using an aqueous solution of sulfuric acid having a concentration of 30 to 70 mass % as a back extractant, thereby recovering Al in the organic phase as aluminum sulfate.

When back extraction of a used extractant is performed by using a 2 N to 8 N aqueous solution of hydrochloric acid or an alkaline aqueous solution as aback extractant, Sc, Ti, and Th, which accumulate in the used extractant, can be reduced, and the resultant used extractant can be reused as a recycled extractant.

When the separation and recovery treatment of rare-earth elements which include Sc, Y, and lanthanoids is performed, it is desired that the separation of the crude recovered product into each element be carrying out by a solvent extraction method involving using an extractant prepared by diluting an ester selected from phosphoric acid esters, phosphonic acid esters, phosphinic acid esters, thiophosphinic acid esters, and mixtures of these esters and at least one of tributyl phosphate and trioctylphosphine oxide with a solvent selected from aliphatic hydrocarbons such as hexane, aromatic hydrocarbons such as benzene and toluene, and kerosene, which is a petroleum fraction.

It is preferred to carry out the separation carried out by such solvent extraction method by a countercurrent multistage solvent extraction method.

In the present invention, when the separation and recovery treatment of rare-earth elements from a leachate is performed by the hydroxide precipitation method, as described above, the pH value of the leachate is first adjusted to 4 to 6, hydroxides of Fe and Al precipitated by this pH adjustment are removed by solid-liquid separation, a pH adjuster is then further added to adjust the pH value to 7 or more, and the precipitated hydroxides of rare-earth elements which include Sc, Y, and lanthanoids are separated by solid-liquid separation, thereby recovering a crude recovered product. Further, when the separation and recovery treatment of rare-earth elements from a leachate is performed by the oxalate precipitation method, oxalic acid is added to a leachate directly or to a liquid yielded by adjusting the pH of the leachate to cause Fe and Al to precipitate as their hydroxides, followed by solid-liquid separation, as in the hydroxide precipitation method, rare-earth elements which include Sc, Y, and lanthanoids are caused to precipitate as oxalates, the oxalates are recovered as oxalate compounds of the rare-earth elements which include Sc, Y, and lanthanoids, the oxalate compounds are treated with caustic soda, yielding hydroxides of the rare-earth elements which include Sc, Y, and lanthanoids, and the hydroxides are recovered as a crude recovered product, or the oxalate compounds of the rare-earth elements which include Sc, Y, and lanthanoids are calcined, yielding oxides of the rare-earth elements which include Sc, Y, and lanthanoids, and the oxides are recovered as a crude recovered product. When the separation and recovery treatment of rare-earth elements from a leachate is performed by the carbonate precipitation method, rare-earth elements which include Sc, Y, and lanthanoids are recovered as their carbonate compounds from a leachate, the carbonate compounds are then treated with caustic soda, yielding hydroxides of the rare-earth elements which include Sc, Y, and lanthanoids, and the hydroxides are recovered as a crude recovered product, or the carbonate compounds of the rare-earth elements which include Sc, Y, and lanthanoids are calcined, yielding oxides of the rare-earth elements which include Sc, Y, and lanthanoids, and the oxides are recovered as a crude recovered product. In the present invention, any of these crude recovered products is dissolved in sulfuric acid, hydrochloric acid, or nitric acid, followed by solvent extraction by using an extractant, and hence the present invention has an advantage in that the amount of an expensive extractant to be used can be reduced as much as possible.

EXAMPLES

The method of recovering rare-earth elements according to the present invention, which involves using a bauxite residue as a raw material, is hereinafter specifically described by way of examples and comparative examples, but the present invention is not limited by these examples and comparative examples.

(Preparation of Raw Material Bauxite Residue)

Bauxite was pulverized by using a ball mill, and the resultant bauxite powder having a specific surface area of 24 to 35 m$^2$/g listed in Table 2 was used. Then, a Bayer process was carried out under the conditions of a treatment temperature of 105 to 250° C. and an addition amount of CaO of 0.0 to 3.5 mass % listed in Table 2, and a bauxite residue was recovered after the Bayer process. After that, part of the recovered bauxite residue was used as a raw material bauxite residue without further treatment. On the other hand, the rest of the recovered bauxite residue was used to prepare a slurry initially by adding water at 500 parts by weight with respect to 100 parts by weight of the bauxite residue and then mixing the whole. Subsequently, the slurry was subjected to classification in water using a sieve having a mesh size of 38 μm, yielding a fraction on the sieve having a mesh size of 38 μm and a fraction under the sieve. The fraction having a high specific surface area under the sieve was used a raw material bauxite residue.

The raw material bauxite residue thus obtained was used to measure the content (ppm) of rare-earth elements which include Sc, Y, and lanthanoids, the component composition (Al$_2$O$_3$, Fe$_2$O$_3$, CaO, SiO$_2$, and TiO$_2$) thereof, and the specific surface area (m$^2$/g) thereof. Note that, a direct display specific surface analyzer (product name: MONOSORB; manufactured by Quantachrome Instruments, Inc. (Florida, USA)) was used to measure the specific surface area, and inductively coupled plasma-atomic emission spectroscopy (ICP-AES)

Table 2 shows the results.

Note that, Table 2 includes data that indicate different values of the specific surface area even though the same condition of the Bayer process and the same fractionation treatment are adopted. This is attributed to the fact that different kinds of bauxite were used.

TABLE 2

|  |  | Raw material bauxite residue (Sample No.) | | | | | | |
|---|---|---|---|---|---|---|---|---|
|  |  | 1 | 2 | 3 | 4 | 5 | 6 | 7 |
| Bayer process | Specific surface area (m$^2$/g) of bauxite powder | 28 | 24 | 34 | 35 | 27 | 35 | 35 |
|  | Treatment temperature (° C.) | 135 | 135 | 250 | 105 | 130 | 130 | 180 |
|  | Addition amount (mass %) of CaO | 0.5 | 1.5 | 3.5 | 0.0 | 0.0 | 2.0 | 0.3 |
| Whether or not fractionation treatment using a sieve having a mesh size of 38 μm was performed (A fraction under the sieve was used in the case of "performed.") | | Not Performed | Not Performed | Not Performed | Performed | Performed | Performed | Performed |
| Content (ppm) of rare-earth elements | | 3,530 | 1,628 | 4,024 | 3,718 | 2,271 | 3,751 | 3,694 |
| Specific surface area (m$^2$/g) | | 41.6 | 33.3 | 23.3 | 51.5 | 39.3 | 45.0 | 45.7 |
| Composition (mass %) of compounds | Al$_2$O$_3$ | 19.6 | 21.4 | 11.3 | 27.2 | 28.5 | 26.3 | 19.6 |
|  | Fe$_2$O$_3$ | 43.8 | 34.6 | 53.3 | 46.8 | 39.0 | 42.8 | 47.6 |
|  | CaO | 3.1 | 5.0 | 9.0 | 2.0 | 1.6 | 6.8 | 2.6 |
|  | SiO$_2$ | 2.6 | 4.9 | 2.2 | 1.8 | 5.3 | 1.4 | 2.9 |
|  | TiO$_2$ | 5.5 | 4.3 | 5.4 | 5.5 | 4.7 | 5.2 | 6.0 |

(Fractionation Treatment of Raw Material Bauxite Residue of Sample No. 1)

The raw material bauxite residue of Sample No. 1 was used to prepare a slurry initially by adding water at 500 parts by weight with respect to 100 parts by weight of the raw material bauxite residue and then mixing the whole. Subsequently, the slurry was subjected to classification in water using a sieve having a mesh size of 38 μm or 300 μm, yielding a fraction on the sieve having a mesh size of 38 μm and a fraction under the sieve, and a fraction on the sieve having a mesh size of 300 μm and a fraction under the sieve. Each of the fractions on and under the sieve after each fractionation treatment was used to measure its specific surface area and its content of rare-earth elements.

Table 3 shows the results.

TABLE 3

|  | Before classification | After classification with a sieve having a mesh size of 38 μm | | After classification with a sieve having a mesh size of 300 μm | |
|---|---|---|---|---|---|
|  |  | Under sieve | On sieve | Under sieve | On sieve |
| Ratio of particles (mass %) | (100.0) | 92.0 | 8.0 | 95.4 | 4.6 |
| Specific surface area (m$^2$/g) | 41.6 | 45.8 | 17.6 | 42.1 | 15.8 |
| Content (ppm) of rare-earth elements | 3,530 | 3,698 | 1,584 | 3,632 | 1,461 |

It was found from the results shown in Table 3 that the ratio of particles of under the sieve in the case of performing the fractionation treatment with the sieve having a mesh size of 38 μm was 92 mass %, and the ratio was not significantly different from 95.4 mass % that was the ratio of particles under the sieve in the case of performing the fractionation treatment with the sieve having a mesh size of 300 μm.

Examples 1 to 11 and Comparative Example 1

First, leaching treatment for recovering rare-earth elements was performed by using the raw material bauxite residue of Sample No. 1 and using an aqueous solution of sulfuric acid having a concentration of 2 N as a liquid leaching agent under conditions listed in Table 4 including the liquid-solid ratio (L/S) in slurry, the pH of slurry (initial stage), the treatment temperature (° C.), and the holding time (minute(s)). After completion of the leaching treatment, the resultant slurry was then filtrated to perform solid-liquid separation and the resultant leachate was recovered. Here, in order to calculate the liquid-solid ratio in slurry and the leaching ratio, a raw material bauxite residue was dried under the drying conditions of 110° C. and 2 hours, the mass of the dried product was measured, and the mass was defined as the solid weight (S) of the raw material bauxite residue.

Note that, the leaching treatment in Example 6 was performed in the same manner as in the other examples, except that sulfurous acid gas was blown into a slurry prepared with a raw material bauxite residue and water, converting the water in the slurry to an aqueous solution of sulfurous acid, and the aqueous solution of sulfurous acid was used as a liquid leaching agent. Then, the resultant leachate was recovered.

The resultant leachate of each of Examples 1 to 11 and Comparative Example 1 was used to carry out inductively coupled plasma-atomic emission spectroscopy (ICP-AES) analysis. Measurement was performed on the content of each of the elements Sc, Y, and La, Nd, and Dy, which belong to lanthanoids, and Al, Fe, Ca, Si, and Ti, which are impurities, and the leaching ratio of each element was calculated.

Table 4 shows the results.

TABLE 4

| | | Example | | | | | |
|---|---|---|---|---|---|---|---|
| | | 1 | 2 | 3 | 4 | 5 | 6 |
| Liquid leaching agent (kind of acid) | | $H_2SO_4$ | $H_2SO_4$ | $H_2SO_4$ | $H_2SO_4$ | $H_2SO_4$ | $H_2SO_3$ |
| Liquid-solid ratio (L/S) in slurry | | 7.3 | 6.3 | 8.4 | 8.8 | 8.9 | 20.0 |
| pH value of slurry (initial stage) | | 2.04 | 0.99 | 0.98 | 1.02 | 0.98 | 1.48 |
| Leaching condition | Temperature (° C.) | 75 | 150 | 50 | 75 | 100 | 60 |
| | Holding time (minute(s)) | 30 | 60 | 30 | 30 | 30 | 15 |
| Leaching ratio (mass %) | Sc | 9.7 | 56.8 | 25.8 | 32.7 | 36.0 | 1.0 |
| | Y | 53.9 | 64.5 | 52.4 | 56.4 | 61.5 | 56.3 |
| | La | 72.4 | 58.6 | 75.5 | 81.7 | 89.6 | 61.5 |
| | Nd | 67.1 | 60.2 | 71.3 | 75.6 | 82.2 | 65.3 |
| | Dy | 54.1 | 67.9 | 62.4 | 63.5 | 69.1 | 51.2 |
| | Ca | 18.1 | 2.3 | 29.0 | 32.1 | 31.8 | 84.2 |
| | Al | 18.7 | 55.3 | 24.7 | 30.1 | 40.4 | 22.5 |
| | Si | 79.8 | 85.9 | 91.3 | 90.9 | 99.0 | 99.6 |
| | Ti | 0.0 | 0.0 | 0.4 | 0.5 | 0.2 | 0.2 |
| | Fe | 0.0 | 0.7 | 0.3 | 0.6 | 0.4 | 0.3 |

| | | Example | | | | | Comparative |
|---|---|---|---|---|---|---|---|
| | | 7 | 8 | 9 | 10 | 11 | Example 1 |
| Liquid leaching agent (kind of acid) | | $H_2SO_4$ | $H_2SO_4$ | $H_2SO_4$ | $H_2SO_4$ | $H_2SO_4$ | $H_2SO_4$ |
| Liquid-solid ratio (L/S) in slurry | | 9.1 | 9.1 | 9.1 | 9.1 | 9.1 | 8.3 |
| pH value of slurry (initial stage) | | 1.01 | 1.05 | 1.12 | 1.13 | 1.20 | 1.02 |
| Leaching conditions | Temperature (° C.) | 25 | 25 | 25 | 25 | 25 | 200 |
| | Holding time (minute(s)) | 1 | 5 | 60 | 480 | 2,880 | 300 |
| Leaching ratio (mass %) | Sc | 11.2 | 13.7 | 15.8 | 22.9 | 28.8 | 35.9 |
| | Y | 41.9 | 45.1 | 45.4 | 51.5 | 53.3 | 7.8 |
| | La | 71.1 | 63.5 | 65.7 | 74.3 | 79.8 | 15.7 |
| | Nd | 77.1 | 67.9 | 66.9 | 75.3 | 77.1 | 5.9 |
| | Dy | 68.7 | 51.3 | 50.8 | 60.2 | 62.8 | 14.2 |
| | Ca | 62.5 | 60.9 | 35.5 | 30.1 | 25.2 | 5.6 |
| | Al | 19.1 | 18.4 | 18.1 | 21.0 | 23.0 | 2.7 |
| | Si | 95.7 | 86.0 | 85.3 | 89.7 | 84.0 | 29.8 |
| | Ti | 0.7 | 1.0 | 1.0 | 1.2 | 1.4 | 0.3 |
| | Fe | 0.1 | 0.1 | 0.2 | 0.4 | 0.8 | 0.1 |

Examples 12 to 17 and Comparative Examples 2 to 6

A leachate was recovered in the same manner as in Examples 1 to 11 described above except that leaching treatment for recovering rare-earth elements was performed by using the raw material bauxite residue of each sample number listed in Table 5 and using a liquid leaching agent listed in Table 5 under conditions listed in Table 5 including the liquid-solid ratio (L/S) in slurry, the pH of the slurry (initial stage), the treatment temperature (° C.), and the holding time (minute(s)). The resultant leachate of each of Examples 12 to 17 and Comparative Examples 2 to 6 was used to measure the content of each of the elements Sc, Y, and La, Nd, and Dy, which belong to lanthanoids, and Al, Fe, Ca, Si, and Ti, which are impurities, and the leaching ratio of the each element was calculated.

Table 5 shows the results.

TABLE 5

| | | Example | | | | | |
|---|---|---|---|---|---|---|---|
| | | 12 | 13 | 14 | 15 | 16 | 17 |
| Raw material bauxite residue | Sample No. | 5 | 6 | 6 | 4 | 4 | 4 |
| | Specific surface area ($m^2/g$) | 39.3 | 45.0 | 45.0 | 51.5 | 51.5 | 51.5 |
| Liquid leaching agent (kind of acid) | | $H_2SO_4$ | $H_2SO_4$ | $H_2SO_4$ | $H_2SO_4$ | HCl | $HNO_3$ |
| Liquid-solid ratio (L/S) in slurry | | 6.3 | 25.0 | 3.0 | 5.9 | 5.6 | 5.9 |
| pH value of slurry (initial stage) | | 1.04 | 1.15 | 0.78 | 1.05 | 1.06 | 1.08 |
| Leaching conditions | Temperature (° C.) | 25 | 25 | 75 | 25 | 100 | 100 |
| | Holding time (minute(s)) | 30 | 30 | 30 | 30 | 30 | 30 |
| Leaching ratio (mass %) | Sc | 16.8 | 10.5 | 42.2 | 16.0 | 5.3 | 2.1 |
| | Y | 57.0 | 49.6 | 59.5 | 63.5 | 79.0 | 90.0 |
| | La | 57.3 | 73.1 | 85.9 | 73.5 | 99.7 | 99.6 |
| | Nd | 55.0 | 68.4 | 81.8 | 69.8 | 95.5 | 99.5 |
| | Dy | 50.2 | 58.2 | 62.4 | 56.1 | 69.3 | 83.4 |
| | Ca | 32.4 | 10.3 | 10.8 | 12.0 | 99.8 | 99.9 |
| | Al | 16.2 | 4.8 | 5.5 | 9.2 | 4.9 | 2.3 |
| | Si | 99.6 | 51.6 | 57.2 | 43.6 | 34.1 | 3.7 |
| | Ti | 0.6 | 0.1 | 0.1 | 0.4 | 0.1 | 0.0 |
| | Fe | 0.2 | 0.2 | 1.3 | 0.6 | 0.0 | 0.0 |

| | | Comparative Example | | | | |
|---|---|---|---|---|---|---|
| | | 2 | 3 | 4 | 5 | 6 |
| Raw material bauxite residue | Sample No. | 3 | 2 | 3 | 4 | 4 |
| | Specific surface area ($m^2/g$) | 23.3 | 33.3 | 23.3 | 51.5 | 51.5 |
| Liquid leaching agent (kind of acid) | | $H_2SO_4$ | $H_2SO_4$ | $HNO_3$ | $H_3PO_4$ | $H_2SO_4$ |
| Liquid-solid ratio (L/S) in slurry | | 7.7 | 8.8 | 7.7 | 10.0 | 12.5 |
| pH value of slurry (initial stage) | | 1.03 | 1.07 | 1.03 | 1.30 | 2.70 |
| Leaching conditions | Temperature (° C.) | 25 | 25 | 100 | 25 | 25 |
| | Holding time (minute(s)) | 30 | 30 | 30 | 30 | 30 |
| Leaching ratio (mass %) | Sc | 6.2 | 12.7 | 6.2 | 1.5 | 0.2 |
| | Y | 25.5 | 32.4 | 30.3 | 36.7 | 13.3 |
| | La | 22.2 | 38.0 | 28.8 | 47.5 | 22.0 |
| | Nd | 23.7 | 43.6 | 29.5 | 33.6 | 16.1 |
| | Dy | 31.8 | 44.5 | 38.2 | 39.7 | 10.5 |
| | Ca | 4.7 | 15.4 | 97.6 | 86.0 | 47.9 |
| | Al | 27.8 | 26.1 | 29.4 | 4.3 | 0.0 |
| | Si | 99.8 | 66.1 | 99.6 | 50.7 | 4.1 |
| | Ti | 0.1 | 0.3 | 0.0 | 0.2 | 0.0 |
| | Fe | 0.3 | 0.2 | 0.0 | 1.4 | 0.0 |

As evident from the results shown in Tables 4 and 5, in each of Examples 1 to 17, La, Nd, and Dy, which belong to lanthanoids and are contained in the raw material bauxite residue, were able to be caused to leach at 50 mass % or more, whereas in each of Comparative Examples 2 to 4, in which a raw material bauxite residue having a specific surface area of less than 35 $m^2/g$ was used, La, Nd, and Dy, which belong to lanthanoids, were unable to be caused to leach at 50 mass % or more.

Further, in each of Comparative Example 1, in which the temperature of the leaching treatment was more than 160° C., Comparative Example 5, in which phosphoric acid was used as a mineral acid in the liquid leaching agent, and Comparative Example 6, in which the pH value of the slurry in the leaching treatment was more than 2.2, as evident from the results shown in Table 5, La, Nd, and Dy, which belong to lanthanoids and are contained in the raw material bauxite residue, were unable to be caused to leach at 50 mass % or more.

Further, in the leaching treatment, as the pH value of the slurry was lower, as the treatment temperature was higher, and as the holding time was longer, the leaching ratios of Sc and Y were higher. However, as the pH value of the slurry was lower, the leaching ratios of lanthanoids (La, Nd, and Dy) were higher, and the leaching ratios tended to be higher in a shorter time as the treatment temperature was higher in the temperature range between 20 and 160° C. In addition, the leaching ratios of the lanthanoids showed the minimum value in the holding time from 5 to 60 minutes. When the holding time was shorter than the holding time at which the minimum value was shown, as the holding time was shorter, the leaching ratios of the lanthanoids tended to be higher. When the holding time was longer than the holding time at which the minimum value was shown, as the holding time was longer, the leaching ratios of the lanthanoids tended to be higher.

Example 18

A leachate was recovered in the same manner as in Examples 1 to 17 and Comparative Examples 2 to 6 described above except that leaching treatment for recovering rare-earth elements was performed by using the raw material bauxite residue of each sample number listed in Table 6 and using a liquid leaching agent listed in Table 6 under conditions listed in Table 5 including the liquid-solid ratio (L/S) in slurry, the pH of the slurry (initial stage), the treatment temperature (° C.), and the holding time (minute(s)). The recovered leachate was used to measure the content of each of the elements Sc, Y, and Nd and Dy, which belong to lanthanoids, and Al, Fe, Ca, Si, and Ti, which are impurities, and the leaching ratio of each element was calculated.

Table 6 shows the results.

Example 19

Leaching treatment was performed in the same method as in Example 18. After the leaching treatment, a leachate was recovered after being neutralized with a bauxite residue. The leachate was used to measure the content of each of the elements Sc, Y, and Nd and Dy, which belong to lanthanoids, and Al, Fe, Ca, Si, and Ti, which are impurities, and the leaching ratio of each element was calculated.

Table 6 shows the results.

TABLE 6

| | | Example 18 | Example 19 |
|---|---|---|---|
| Raw material bauxite residue | Sample No. | 5 | 5 |
| | Specific surface area ($m^2/g$) | 39.3 | 39.3 |
| | Amount used (kg) | 0.100 | 0.100 |
| Leaching treatment | Kind of acid | $H_2SO_4$ | $H_2SO_4$ |
| | Liquid-solid ratio | 5.5 | 5.5 |
| | Leaching conditions Temperature (° C.) | 30 | 30 |
| | pH | 1.01 | 1.00 |
| | Time (minute(s)) | 30 | 30 |
| Amount of bauxite residue for neutralization (kg) | | 0.0 | 0.081 |
| Neutralization treatment | Temperature (° C.) | — | 30 |
| | pH | — | 4.25 |
| | Time (minute(s)) | — | 30 |
| Amount of leachate (mL) | | 550 | 550 |
| Leaching concentration (ppm) | Sc | 2.4 | 2.6 |
| | Y | 38 | 51 |
| | Nd | 36 | 50 |
| | Dy | 5.7 | 8.3 |
| | Ca | 640 | 650 |
| | Al | 1,650 | 320 |
| | Si | 1,120 | 120 |
| | Ti | 24 | 5 |
| | Fe | 86 | 29 |

It is found from Table 6 that, in Example 19, in which neutralization was performed with a bauxite residue, the concentrations of Al, Fe, Si, and Ti, which are impurities, are smaller, while the concentrations of Sc, Y, and Nd and Dy, which belong to lanthanoids, are larger, in comparison to those in Example 18. Further, as a result, the amount of a mineral acid aqueous solution used was able to be reduced with respect to the recovery amounts of Sc, Y, and Nd and Dy, which belong to lanthanoids.

Example 20

The leachate yielded in Example 3 and having the composition shown in Table 7 was used to perform, by a solvent extraction method, the removal of impurity elements and the concentration of rare-earth elements. In the solvent extraction method, first, the pH of the leachate was initially adjusted to 3.0, the resultant precipitate was removed, and the pH was adjusted to 1.5. After that, there was used an extractant prepared by diluting DEHPA with kerosene to a concentration of 0.8 M, and the leachate and the extractant were brought into contact with each other at a liquid ratio of 1:1 under stirring for 3 minutes. Then, the mixture was subjected to liquid-liquid separation into an extracted organic phase and an aqueous phase after completion of extraction (aqueous phase after extraction).

TABLE 7

| Sample | | $H_2SO_4$ leachate |
|---|---|---|
| pH | | 2.0 |
| Component (ppm) | Sc | 1.2 |
| | Y | 44.2 |
| | La | 66.7 |
| | Pr | 10.8 |
| | Nd | 41.4 |
| | Dy | 5.6 |
| | Ca | 751 |
| | Al | 3,044 |
| | Si | 1,312 |
| | Ti | 16 |
| | Fe | 123 |

A 6 N aqueous solution of hydrochloric acid was used as a back extractant, and the extracted organic phase and the back extractant were brought into contact with each other at a liquid ratio of 1:1 under stirring for 3 minutes. Then, the mixture was again subjected to liquid-liquid separation into an organic phase after completion of back extraction (organic phase after back extraction) and a back-extracted aqueous phase. As a result, rare-earth elements in the extracted organic phase were transferred into the back-extracted aqueous phase, and were separated and recovered.

When a 0.02 N aqueous solution of hydrochloric acid is used as a back extractant, the organic phase after back extraction and the back extractant are brought into contact with each other at a liquid ratio of 1:1 under stirring for 3 minutes, and then the mixture is subjected to liquid-liquid separation, followed by purification, the resultant liquid can be reused cyclically as an extractant prepared by diluting DEHPA with kerosene to a concentration of 0.8 M.

Table 8 shows the recovery ratios of the rare-earth elements and impurities recovered by this solvent extraction method.

Examples 21 to 24

Rare-earth elements were transferred into the back-extracted aqueous phase, and were separated and recovered under the same conditions as those in Example 20, except that, in the same method as that in Example 20, the time of contact between the leachate and the extractant was set to 0.5 minute, 1 minute, 5 minutes, and 10 minutes.

Table 8 shows the recovery ratios of the rare-earth elements and impurities recovered by this solvent extraction method.

Examples 25 to 29

Rare-earth elements were transferred into the back-extracted aqueous phase, and were separated and recovered under the same conditions as those in Example 20, except that, in the same method as that in Example 20, the time of contact between the extracted organic phase and the back extractant was set to 0.5 minute, 1 minute, 5 minutes, 10 minutes, and 15 minutes.

Table 8 shows the recovery ratios of the rare-earth elements and impurities recovered by this solvent extraction method.

Example 30

The leachate yielded in Example 3 and having the composition shown in Table 7 was used to perform, by a solvent extraction method, the removal of impurity elements and the concentration of rare-earth elements. In the solvent extraction method, first, the pH of the leachate was initially adjusted to 1.75. After that, there was used an extractant prepared by diluting DEHPA with kerosene to a concentration of 0.8 M, and the leachate and the extractant were brought into contact with each other at a liquid ratio of 1:1 under stirring for 3 minutes. Then, the mixture was subjected to liquid-liquid separation into an extracted organic phase and an aqueous phase after extraction. Emulsion occurred between the organic phase and the aqueous phase at the time of the solvent extraction, but the emulsion was separated into the organic phase side at the time of the liquid-liquid separation and was then removed by filtrating the organic phase with a filter.

A 6 N aqueous solution of hydrochloric acid was used as a back extractant, and the extracted organic phase and the back extractant were brought into contact with each other at a liquid ratio of 1:1 under stirring for 3 minutes. Then, the mixture was again subjected to liquid-liquid separation into an organic phase after back extraction and a back-extracted aqueous phase. As a result, rare-earth elements were transferred into the back-extracted aqueous phase from the extracted organic phase, and were separated and recovered.

When a 0.02 N aqueous solution of hydrochloric acid is used as a back extractant, the organic phase after back extraction and the back extractant are brought into contact with each other at a liquid ratio of 1:1 under stirring for 3 minutes, and then the mixture is subjected to liquid-liquid separation, followed by purification, the resultant liquid can be reused cyclically as an extractant prepared by diluting DEHPA with kerosene to a concentration of 0.8 M.

Table 8 shows the recovery ratios of the rare-earth elements and impurities recovered by this solvent extraction method.

Example 31

Rare-earth elements were transferred into the back-extracted aqueous phase, and were separated and recovered by the same implementation method and under the same conditions as those in Example 20, except that pH adjustment was performed by adding the same bauxite residue as that used in Example 4 instead of adding an aqueous solution of sodium hydroxide. In this case, the amount of the added bauxite residue was 0.115 kg with respect to 0.1 kg of the bauxite residue used as a raw material for leaching.

Table 8 shows the recovery ratios of the rare-earth elements and impurities recovered by this solvent extraction method. Note that, when the recovery ratios were calculated, the rare-earth elements contained in the bauxite residue used for the pH adjustment were taken into consideration, and hence recovery ratios with respect to 2.15 times the amount of the bauxite residue used as a raw material for leaching are shown.

TABLE 8

| | | Example | | | | | |
|---|---|---|---|---|---|---|---|
| | | 20 | 21 | 22 | 23 | 24 | 25 |
| Extraction time (minute(s)) | | 3 | 0.5 | 1 | 5 | 10 | 3 |
| Back extraction time (minute(s)) | | 3 | 3 | 3 | 3 | 3 | 0.5 |
| Recovery ratio (mass %) | Sc | 0 | 0 | 0 | 0 | 0 | 0 |
| | Y | 87 | 90 | 88 | 84 | 87 | 43 |
| | La | 87 | 85 | 90 | 81 | 76 | 73 |
| | Pr | 94 | 98 | 93 | 92 | 90 | 93 |
| | Nd | 96 | 98 | 96 | 94 | 92 | 94 |
| | Dy | 100 | 100 | 100 | 100 | 100 | 88 |
| | Ca | 39 | 53 | 44 | 33 | 29 | 41 |
| | Al | 1 | 1 | 1 | 2 | 2 | 0 |
| | Si | 0 | 0 | 0 | 0 | 0 | 0 |
| | Ti | 4 | 4 | 5 | 3 | 3 | 3 |
| | Fe | 32 | 19 | 29 | 35 | 36 | 29 |

| | | Example | | | | | |
|---|---|---|---|---|---|---|---|
| | | 26 | 27 | 28 | 29 | 30 | 31 |
| Extraction time (minute(s)) | | 3 | 3 | 3 | 3 | 3 | 3 |
| Back extraction time (minute(s)) | | 1 | 5 | 10 | 15 | 3 | 3 |
| Recovery ratio (mass %) | Sc | 0 | 0 | 0 | 0 | 0 | 0 |
| | Y | 76 | 88 | 89 | 89 | 78 | 70 |
| | La | 77 | 77 | 77 | 77 | 71 | 63 |
| | Pr | 95 | 95 | 95 | 95 | 87 | 64 |
| | Nd | 96 | 96 | 96 | 96 | 89 | 63 |
| | Dy | 100 | 100 | 100 | 100 | 90 | 77 |
| | Ca | 43 | 43 | 41 | 44 | 41 | 14 |
| | Al | 1 | 2 | 3 | 4 | 1 | 1 |
| | Si | 0 | 0 | 0 | 0 | 0 | 0 |
| | Ti | 4 | 4 | 4 | 4 | 3 | 0 |
| | Fe | 28 | 28 | 30 | 30 | 32 | 4 |

It is found, on the basis of the recovery ratios of the rare-earth elements and impurities in Examples 20 to 29 shown in Table 8, that as the extraction time is shorter, the recovery ratios of the rare-earth elements are higher, that as the back extraction time is longer, the recovery ratios of the rare-earth elements are higher, but even Y, which shows the lowest recovery ratio, shows a recovery ratio exceeding 75 mass % for a back extraction time of 1 minute, and that as both the extraction time and back extraction time are longer, the recovery ratios of impurities such as Al are higher.

It is found on the basis of the results of Example 30 that, when emulsion occurs between the organic phase and the aqueous phase at the time of the solvent extraction, the recovery ratios of the rare-earth elements are slightly lower in comparison to those in Example 20, in which the extraction time and back extraction time are the same as those in Example 30.

Further, in Example 31, in which pH adjustment was performed by adding a bauxite residue, rare-earth elements which dissolved from the bauxite residue added at the time of the pH adjustment are also recovered, but the recovery ratios of the rare-earth elements are not as high as the recovery ratios of the rare-earth elements which were caused to leach from the bauxite residue used as a raw material for leaching. Thus, it is found that the recovery ratios in Example 31 are lower than those in Example 20, but Ca and Ti coprecipitate with Fe and the concentrations of these elements are significantly reduced. In addition, a bauxite residue is produced as a by-product in a Bayer process for producing aluminum from bauxite, resulting in the cost reduction.

Example 32

The leachate yielded in Example 3 and having the composition shown in Table 7 was used to perform, by a solvent extraction method, the removal of impurity elements and the concentration of rare-earth elements. In the solvent extraction method, first, the pH of the leachate was initially adjusted to 3.0, the resultant precipitate was removed, and the pH was adjusted to 1.0. After that, there was used an extractant prepared by diluting DEHPA with kerosene to a concentration of 0.8 M, and the leachate and the extractant were brought into contact with each other at a liquid ratio of 1:1 under stirring for 3 minutes. Then, the mixture was subjected to liquid-liquid separation into an extracted organic phase and an aqueous phase after extraction.

A 6 N aqueous solution of hydrochloric acid was used as a back extractant, and the extracted organic phase and the back extractant were brought into contact with each other at a liquid ratio of 1:1 under stirring for 3 minutes. Then, the mixture was again subjected to liquid-liquid separation into an organic phase after back extraction and a back-extracted aqueous phase. As a result, rare-earth elements transferred from the extracted organic phase into the back-extracted aqueous phase, and were separated and recovered.

When a 0.02 N aqueous solution of hydrochloric acid is used as a back extractant, the organic phase after back extraction and the back extractant are agitated at a liquid ratio of 1:1 for 3 minutes, and then the mixture is subjected to liquid-liquid separation, followed by purification, the resultant liquid can be reused cyclically as an extractant prepared by diluting DEHPA with kerosene to a concentration of 0.8 M.

Table 9 shows the recovery ratios of the rare-earth elements and impurities recovered by this solvent extraction method.

Examples 33 and 34

Rare-earth elements were transferred into the back-extracted aqueous phase, and were separated and recovered under the same conditions as those in Example 32, except that, in the same method as that in Example 32, an extractant prepared by diluting DEHPA with kerosene to a concentration of 1.2 M and an extractant prepared by diluting DEHPA with kerosene to a concentration of 1.5 M were used.

Table 9 shows the recovery ratios of the rare-earth elements and impurities recovered by this solvent extraction method.

Examples 35 and 36

Rare-earth elements were transferred into the back-extracted aqueous phase, and were separated and recovered under the same conditions as those in Example 32, except that, in the same method as that in Example 32, the pH of the leachate was initially adjusted to 3.0, the resultant precipitate was removed, and the pH was again adjusted to 1.5 or 2.0.

Table 9 shows the recovery ratios of the rare-earth elements and impurities recovered by this solvent extraction method.

Example 37

The leachate yielded in Example 3 and having the composition shown in Table 7 was used to perform, by a solvent extraction method, the removal of impurity elements and the concentration of rare-earth elements. In the solvent extraction method, first, the pH of the leachate was initially adjusted to 3.0, the resultant precipitate was removed, and the pH was again adjusted to 2.0. After that, there was used an extractant prepared by diluting PC88A with kerosene to a concentration of 0.8 M, and the leachate and the extractant were brought into contact with each other at a liquid ratio of 1:1 under stirring for 3 minutes. Then, the mixture was subjected to liquid-liquid separation into an extracted organic phase and an aqueous phase after extraction.

A 6 N aqueous solution of hydrochloric acid was used as a back extractant, and the extracted organic phase and the back extractant were brought into contact with each other at a liquid ratio of 1:1 under stirring for 3 minutes. Then, the mixture was again subjected to liquid-liquid separation into an organic phase after back extraction and a back-extracted aqueous phase. As a result, rare-earth elements were transferred from the extracted organic phase into the back-extracted aqueous phase, and were separated and recovered.

When a 0.02 N aqueous solution of hydrochloric acid is used as a back extractant, the organic phase after back extraction and the back extractant are brought into contact with each other at a liquid ratio of 1:1 under stirring for 3 minutes, and then the mixture is subjected to liquid-liquid separation, followed by purification, the resultant liquid can be reused cyclically as an extractant prepared by diluting PC88A with kerosene to a concentration of 0.8 M.

Table 9 shows the recovery ratios of the rare-earth elements and impurities recovered by this solvent extraction method.

Examples 38 to 40

Rare-earth elements were transferred into the back-extracted aqueous phase, and were separated and recovered under the same conditions as those in Example 37, except that, in the same method as that in Example 37, an extractant prepared by diluting PC88A with kerosene to a concentration of 0.5 to 1.5 M was used.

Table 9 shows the recovery ratios of the rare-earth elements and impurities recovered by this solvent extraction method.

Examples 41 to 43

Rare-earth elements were transferred into the back-extracted aqueous phase, and were separated and recovered under the same conditions as those in Example 37, except that, in the same method as that in Example 37, the pH of the leachate was initially adjusted to 3.0, the resultant precipitate was removed, and the pH was again adjusted to 1.5 to 3.0.

Table 9 shows the recovery ratios of the rare-earth elements and impurities recovered by this solvent extraction method.

TABLE 9

| | Example | | | | | |
|---|---|---|---|---|---|---|
| | 32 | 33 | 34 | 35 | 36 | 37 |
| Kind of extractant | DEHPA | DEHPA | DEHPA | DEHPA | DEHPA | PC88A |
| Concentration (M) of extractant | 0.8 | 1.2 | 1.5 | 0.8 | 0.8 | 0.8 |

TABLE 9-continued

| | | | | | | | |
|---|---|---|---|---|---|---|---|
| Adjusted value of pH of leachate | | 1.0 | 1.0 | 1.0 | 1.5 | 2.0 | 2.0 |
| Recovery ratio (mass %) | Sc | 0 | 0 | 0 | 0 | 0 | 0 |
| | Y | 100 | 93 | 80 | 100 | 96 | 94 |
| | La | 26 | 51 | 64 | 80 | 97 | 5 |
| | Pr | 76 | 91 | 100 | 100 | 100 | 39 |
| | Nd | 83 | 97 | 100 | 100 | 100 | 50 |
| | Dy | 100 | 100 | 100 | 100 | 100 | 94 |
| | Ca | 11 | 24 | 33 | 37 | 55 | 1 |
| | Al | 0 | 0 | 0 | 1 | 1 | 8 |
| | Si | 0 | 0 | 0 | 0 | 0 | 0 |
| | Ti | 3 | 2 | 1 | 3 | 3 | 0 |
| | Fe | 9 | 9 | 8 | 22 | 31 | 70 |

| | | Example | | | | | |
|---|---|---|---|---|---|---|---|
| | | 38 | 39 | 40 | 41 | 42 | 43 |
| Kind of extractant | | PC88A | PC88A | PC88A | PC88A | PC88A | PC88A |
| Concentration (M) of extractant | | 0.5 | 1.2 | 1.5 | 0.8 | 0.8 | 0.8 |
| Adjusted value of pH of leachate | | 2.0 | 2.0 | 2.0 | 1.5 | 2.5 | 3.0 |
| Recovery ratio (mass %) | Sc | 0 | 0 | 0 | 0 | 0 | 0 |
| | Y | 97 | 94 | 94 | 88 | 97 | 100 |
| | La | 2 | 12 | 18 | 1 | 9 | 10 |
| | Pr | 18 | 56 | 65 | 11 | 56 | 63 |
| | Nd | 25 | 69 | 77 | 14 | 68 | 76 |
| | Dy | 97 | 97 | 91 | 87 | 100 | 100 |
| | Ca | 1 | 2 | 2 | 1 | 1 | 1 |
| | Al | 7 | 9 | 8 | 4 | 11 | 13 |
| | Si | 0 | 0 | 0 | 0 | 0 | 0 |
| | Ti | 0 | 0 | 0 | 0 | 1 | 0 |
| | Fe | 82 | 61 | 48 | 65 | 79 | 73 |

It is found, on the basis of the recovery ratios of the rare-earth elements and impurities in Examples 32 to 43 shown in Table 9, that the use of DEHPA shows higher recovery ratios of the rare-earth elements but lower recovery ratios of Al than the use of PC88A, that as the pH of the leachate is higher in both the case of using DEHPA as an extractant and the case of using PC88A as an extractant, the recovery ratios of both the rare-earth elements and Al tend to be higher, that when DEHPA is used as an extractant, as the concentration thereof is higher, the recovery ratios of both the rare-earth elements and Al are higher, and that when PC88A is used as an extractant, as the concentration thereof is higher, the recovery ratios of the rare-earth elements are higher, but the recovery ratio of Al has its maximum point near the concentration of 1.2 M. In Examples 32 to 43 shown in Table 9, all the recovery ratios of Sc are 0%, and hence Sc needs to be recovered by the pre-extraction mentioned below.

Examples 44 to 49

The leachate yielded in Example 3 and having the composition shown in Table 7 was used to perform, by a solvent extraction method including the pre-extraction, the removal of impurity elements and the concentration of rare-earth elements. In the method, first, the pH of the leachate was initially adjusted to 3.0, the resultant precipitate was removed, and the pH was again adjusted to 1.0 or 1.25. After that, there was used a pre-extractant prepared by diluting PC88A with kerosene to a concentration of 0.01 to 0.02 M, and the leachate and the pre-extractant were brought into contact with each other at a liquid ratio of 1:1 under stirring for 3 minutes. Then, the mixture was subjected to liquid-liquid separation into a pre-extracted organic phase and an aqueous phase after pre-extraction. Subsequently, there was used an extractant prepared by diluting DEHPA with kerosene to a concentration of 0.8 M, and the recovered aqueous phase after pre-extraction and the extractant were brought into contact with each other at a liquid ratio of 1:1 under stirring for 3 minutes. Then, the mixture was subjected to liquid-liquid separation into an extracted organic phase and an aqueous phase after extraction.

A 1 M aqueous solution of sodium carbonate was used as a back extractant, and the pre-extracted organic phase and the back extractant were brought into contact with each other at a liquid ratio of 1:1 under stirring for 3 minutes. Then, the mixture was again subjected to liquid-liquid separation into an organic phase after back extraction and a back-extracted aqueous phase. As a result, rare-earth elements were transferred from the pre-extracted organic phase into the back-extracted aqueous phase, and were separated and recovered.

A 6 N aqueous solution of hydrochloric acid was used as a back extractant, and the extracted organic phase and the back extractant were brought into contact with each other at a liquid ratio of 1:1 under stirring for 3 minutes. Then, the mixture was again subjected to liquid-liquid separation into an organic phase after back extraction and a back-extracted aqueous phase. As a result, rare-earth elements were transferred from the extracted organic phase into the back-extracted aqueous phase, and were separated and recovered.

When a 0.02 N aqueous solution of hydrochloric acid is used as a back extractant, the organic phase after back extraction and the back extractant are brought into contact with each other at a liquid ratio of 1:1 under stirring for 3 minutes, and then the mixture is subjected to liquid-liquid separation, followed by purification, the resultant liquid can be reused cyclically as an extractant prepared by diluting DEHPA with kerosene to a concentration of 0.8 M.

Table 10 shows the recovery ratios of the rare-earth elements and impurities recovered from the extracted organic phase and the recovery ratios of the rare-earth elements and impurities recovered from the pre-extracted organic phase by this solvent extraction method.

TABLE 10

|  |  | Example | | | | | |
|---|---|---|---|---|---|---|---|
|  |  | 44 | 45 | 46 | 47 | 48 | 49 |
| Concentration (M) of pre-extractant | | 0.01 | 0.015 | 0.02 | 0.01 | 0.015 | 0.02 |
| Adjusted value of pH of leachate | | 1.0 | 1.0 | 1.0 | 1.25 | 1.25 | 1.25 |
| Recovery ratio (mass %) from extracted organic phase | Sc | 0 | 0 | 0 | 0 | 0 | 0 |
| | Y | 95 | 90 | 94 | 78 | 76 | 75 |
| | La | 24 | 24 | 23 | 45 | 45 | 43 |
| | Pr | 69 | 67 | 70 | 70 | 68 | 67 |
| | Nd | 75 | 78 | 74 | 74 | 72 | 72 |
| | Dy | 91 | 93 | 91 | 81 | 79 | 77 |
| | Ca | 9 | 8 | 10 | 18 | 18 | 18 |
| | Al | 0 | 0 | 0 | 1 | 1 | 1 |
| | Si | 0 | 0 | 0 | 0 | 0 | 0 |
| | Ti | 2 | 1 | 1 | 1 | 1 | 1 |
| | Fe | 8 | 8 | 8 | 17 | 16 | 15 |
| Recovery ratio (mass %) from pre-extracted organic phase | Sc | 92 | 94 | 90 | 92 | 90 | 95 |
| | Y | 0 | 0 | 0 | 0 | 0 | 0 |
| | La | 0 | 0 | 0 | 0 | 0 | 0 |
| | Pr | 0 | 0 | 0 | 0 | 0 | 0 |
| | Nd | 0 | 0 | 0 | 0 | 0 | 0 |
| | Dy | 0 | 0 | 0 | 0 | 0 | 0 |
| | Ca | 0 | 0 | 0 | 0 | 0 | 0 |
| | Al | 0 | 0 | 0 | 0 | 0 | 0 |
| | Si | 0 | 0 | 0 | 0 | 0 | 0 |
| | Ti | 75 | 70 | 69 | 80 | 76 | 75 |
| | Fe | 18 | 21 | 23 | 19 | 23 | 25 |

It is found, on the basis of the recovery ratios of the rare-earth elements and impurities in Examples 44 to 49 shown in Table 10, that the recovery ratios of the rare-earth elements except Sc are kept at almost the same level in comparison to those in Example 32, but the recovery ratios of Ca and Ti among the impurities are significantly lowered. On the other hand, it is found, on the basis of the recovery ratios of the rare-earth elements and impurities recovered from the pre-extracted organic phase, that Sc can be recovered at 90% or more separately from the other rare-earth elements.

Examples 50 to 58

The leachate yielded in Example 3 and having the composition shown in Table 7 was used to perform, by a solvent extraction method, the removal of impurity elements and the concentration of rare-earth elements. In the solvent extraction method, first, the pH of the leachate was initially adjusted to 3.0, the resultant precipitate was removed, and the pH was again adjusted to 1.0. After that, there was used an extractant prepared by diluting DEHPA with kerosene to a concentration of 0.8 M, and the leachate and the extractant were brought into contact with each other at a liquid ratio of 1:1 under stirring for 3 minutes. Then, the mixture was subjected to liquid-liquid separation into an extracted organic phase and an aqueous phase after extraction.

A 50 mass % aqueous solution of sulfuric acid was used as a back extractant, and the extracted organic phase and the back extractant were brought into contact with each other at a liquid ratio of 1:1 under stirring for 1 to 180 minutes. Elements including the rare-earth elements were precipitated as solid sulfates, and hence the solid sulfates containing the rare-earth elements were recovered by solid-liquid separation.

When a 0.02 N aqueous solution of hydrochloric acid is used as a back extractant, the organic phase after back extraction and the back extractant are brought into contact with each other at a liquid ratio of 10:1 under stirring for 3 minutes, and then the mixture is subjected to liquid-liquid separation, followed by purification, the resultant liquid can be reused cyclically as an extractant prepared by diluting DEHPA with kerosene to a concentration of 0.8 M.

Table 11 shows the recovery ratios of the rare-earth elements and impurities recovered by this solvent extraction method.

TABLE 11

|  |  | Example | | | | |
|---|---|---|---|---|---|---|
|  |  | 50 | 51 | 52 | 53 | 54 |
| Back extraction time (minute(s)) | | 1 | 3 | 5 | 30 | 60 |
| Recovery ratio (mass %) | Sc | 0 | 0 | 0 | 0 | 0 |
| | Y | 44 | 91 | 95 | 95 | 95 |
| | La | 21 | 23 | 23 | 23 | 23 |
| | Pr | 57 | 62 | 63 | 63 | 63 |
| | Nd | 64 | 69 | 69 | 69 | 69 |
| | Dy | 80 | 100 | 100 | 100 | 100 |
| | Ca | 10 | 11 | 11 | 11 | 11 |
| | Al | 0.0 | 0.0 | 0.0 | 0.1 | 0.1 |
| | Si | 0 | 0 | 0 | 0 | 0 |
| | Ti | 3 | 0 | 0 | 0 | 0 |
| | Fe | 0 | 0 | 0 | 0 | 0 |

|  |  | Example | | | |
|---|---|---|---|---|---|
|  |  | 55 | 56 | 57 | 58 |
| Back extraction time (minute(s)) | | 90 | 120 | 150 | 180 |
| Recovery ratio (mass %) | Sc | 0 | 0 | 0 | 0 |
| | Y | 95 | 95 | 95 | 95 |
| | La | 23 | 23 | 23 | 23 |
| | Pr | 63 | 61 | 60 | 60 |
| | Nd | 69 | 69 | 69 | 69 |
| | Dy | 100 | 100 | 100 | 99 |
| | Ca | 11 | 11 | 11 | 11 |
| | Al | 0.1 | 0.2 | 0.2 | 0.2 |
| | Si | 0 | 0 | 0 | 0 |
| | Ti | 0 | 0 | 0 | 0 |
| | Fe | 0 | 0 | 0 | 0 |

It is found, on the basis of the recovery ratios of the rare-earth elements and impurities in Examples 50 to 58 shown in Table 11, that Fe and Ti are hardly recovered, but the rare-earth elements except Sc can be each recovered at a high recovery ratio, and that as the back extraction time is longer, the recovery ratio of Al is higher, but when the back extraction time is 5 minutes or less, the recovery ratio of Al can be kept at a low value of less than 0.1%.

Example 59

Figure 4:
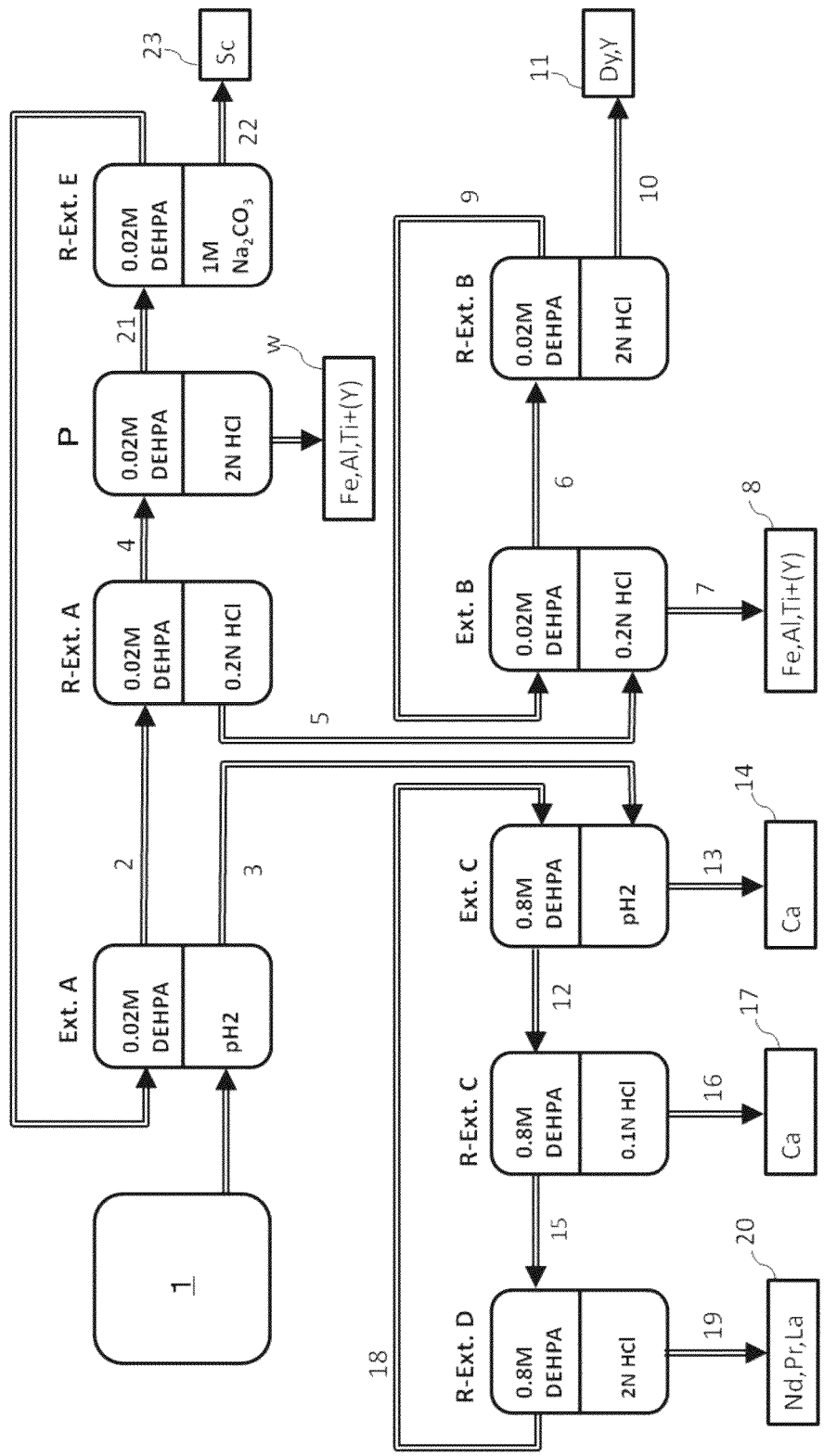
FIG. 4 is a flow chart illustrating the removal of impurity elements in a leachate and the concentration of rare-earth elements in the leachate performed by a two-stage solvent extraction method according to Example 59 of the present invention.

The leachate yielded in Example 3 and having the composition shown in Table 7 was used to perform the removal of impurity elements and the concentration of rare-earth elements by the two-stage solvent extraction method illustrated in FIG. 4. The details are hereinafter described with reference to FIG. 4.

The two-stage solvent extraction method was performed as follows. First, in an extraction operation A (Ext. A), the pH of a leachate (1) was adjusted to 2.0, an extractant prepared by diluting DEHPA with hexane to a concentration of 0.02 M was then used, the leachate (1) and the extractant were brought into contact with each other at a liquid ratio of 1:1 under stirring for 3 minutes, and then the mixture was subjected to liquid-liquid separation into an extracted organic phase A (2) and an aqueous phase after extraction A (3).

In this case, Y and Dy are contained in the extracted organic phase A (2), and the rare-earth elements ranging from La to Nd are contained in the aqueous phase after extraction A (3).

For the extracted organic phase A (2), in a back extraction operation A (R-Ext. A), a 0.2 N aqueous solution of hydrochloric acid was used as aback extractant, the extracted organic phase A (2) and the back extractant were brought into contact with each other at a liquid ratio of 1:1 under stirring for 3 minutes, the mixture was then subjected to liquid-liquid separation again into an organic phase after back extraction A (4) and a back-extracted aqueous phase A (5), and Y and Dy were separated from the extracted organic phase A (2) into the back-extracted aqueous phase A (5).

For the organic phase after back extraction A (4), in a purification operation (P), a 2 N aqueous solution of hydrochloric acid is used as a back extractant, the organic phase after back extraction A (4) and the back extractant are brought into contact with each other at a liquid ratio of 1:1 under stirring for 3 minutes, and then the mixture is subjected to liquid-liquid separation, followed by purification. Then, the resultant liquid can be reused cyclically as an extractant prepared by diluting DEHPA with hexane to a concentration of 0.02 M through the back extraction step of Sc to be described later, and the used back extractant is discarded as a waste liquid (W).

Further, for the above-mentioned back-extracted aqueous phase A (5) containing Y and Dy separated from the extracted organic phase A (2), there was performed an extraction operation B (Ext. B), in which an extractant prepared by diluting DEHPA with hexane to a concentration of 0.02 M was used, the back-extracted aqueous phase A (5) and the extractant were brought into contact with each other at a liquid ratio of 1:1 under stirring for 5 minutes, and then the mixture was subjected to liquid-liquid separation into an extracted organic phase B (6) and an aqueous phase after extraction B (7), discarding the aqueous phase after extraction B (7) as a waste liquid.

For the above-mentioned extracted organic phase B (6), in a back extraction operation B (R-Ext. B), a 0.2 N aqueous solution of hydrochloric acid was used as a back extractant, the extracted organic phase B (6) and the back extractant were brought into contact with each other at a liquid ratio of 1:1 under stirring for 5 minutes, the mixture was then subjected to liquid-liquid separation into an organic phase after back extraction B (9) and a back-extracted aqueous phase B (10), and Y and Dy were separated by being transferred from the extracted organic phase B (6) to the above-mentioned back-extracted aqueous phase B (10) and was recovered as a recovery No. 1 (11).

When the organic phase after back extraction B (9) is subjected to the same treatment as in the above-mentioned purification operation (P) (not shown), the resultant liquid can be reused cyclically as an extractant prepared by diluting DEHPA with hexane to a concentration of 0.02 M.

On the other hand, after the pH of the above-mentioned aqueous phase after extraction A (3) was adjusted to 2, there was performed an extraction operation C (Ext. C), in which an extractant prepared by diluting DEHPA with hexane to a concentration of 0.8 M was used, the aqueous phase after extraction A (3) and the extractant were brought into contact with each other at a liquid ratio of 1:1 under stirring for 3 minutes, and then the mixture was subjected to liquid-liquid separation into an extracted organic phase C (12) and an aqueous phase after extraction C (13), discarding the aqueous phase after extraction C (13) as a waste liquid (14).

For the above-mentioned extracted organic phase C (12), in a back extraction operation C (R-Ext. C), a 0.1 N aqueous solution of hydrochloric acid was used as a back extractant, the extracted organic phase C (12) and the back extractant were brought into contact with each other at a liquid ratio of 1:1 under stirring for 5 minutes, and the mixture was then subjected to liquid-liquid separation into an organic phase after back extraction C (15) and a back-extracted aqueous phase C (16). As a result, Ca was removed from the extracted organic phase C (12) and the back-extracted aqueous phase C (16) containing Ca was discarded as a waste liquid (17).

Then, for the above-mentioned organic phase after back extraction C (15), in a back extraction operation D (R-Ext. D), a 2 N aqueous solution of hydrochloric acid was used as a back extractant, the organic phase after back extraction C (15) and the back extractant were brought into contact with each other at a liquid ratio of 1:1 under stirring for 5 minutes, the mixture was then subjected to liquid-liquid separation into an organic phase after back extraction D (18) and a back-extracted aqueous phase D (19), and the rare-earth elements ranging from La to Nd were separated from the organic phase after back extraction C (15) into the back-extracted aqueous phase D (19). Oxalic acid was added to the back-extracted aqueous phase D (19), thereby causing rare-earth oxalates to precipitate, and the rare-earth elements ranging from La to Nd were recovered as a recovery No. 2 (20).

When the organic phase after back extraction D (18) is subjected to the same treatment as in the above-mentioned purification operation (P) (not shown), the resultant liquid can be reused cyclically as an extractant prepared by diluting DEHPA with hexane to a concentration of 0.8 M.

Table 12 shows the recovery ratios of the rare-earth elements and impurities recovered by this two-stage solvent extraction method.

In this two-stage solvent extraction method, Sc is not back-extracted even in the above-mentioned purification operation (P) while keeping the state in which Sc is extracted in the organic phase after back extraction A (4). Thus, in a back extraction operation E (R-Ext. E) for recovering Sc, a 1 M aqueous solution of sodium carbonate was used as a back extractant, the above-mentioned organic phase after purification operation (P) E (21) and the back extractant were brought into contact with each other at a liquid ratio of 1:1 under stirring for 3 minutes, and the mixture was then subjected to liquid-liquid separation into an organic phase after back extraction and a back-extracted aqueous phase (22). Consequently, Sc was separated by being transferred from the organic phase after purification operation (P) E (21) into the back-extracted aqueous phase (22) and was recovered as a recovery No. 3 (23).

Example 60

The leachate yielded in Example 3 and having the composition shown in Table 7 was used to perform, by an oxalate precipitation method, the removal of impurity elements and the concentration of rare-earth elements. In the oxalate precipitation method, oxalic acid was added to the leachate of Example 3 at about 1.5 chemical equivalent weights with respect to the rare-earth ions contained in the leachate, only the rare-earth elements were caused to precipitate as oxalates, and solid-liquid separation was performed, thereby recovering the rare-earth oxalates.

Table 12 shows the recovery ratios of the rare-earth elements and impurities recovered by the oxalate precipitation method.

Example 61

The leachate yielded in Example 3 and having the composition shown in Table 7 was used to perform, by a hydroxide precipitation method, the removal of impurity elements and the concentration of rare-earth elements. In the hydroxide precipitation method, first, the pH of the leachate of Example 3 was adjusted to pH 4.5 at which the solubility of Al ions and the solubility of Fe ions were small and the solubility of rare-earth ions was large, thereby causing Al and Fe to precipitate as hydroxides, and the precipitated hydroxides of Al and Fe were removed by solid-liquid separation. After that, caustic soda was further added to the resultant liquid, increasing the pH thereof to 11, rare-earth ions were caused to precipitate as hydroxides, and solid-liquid separation was performed, thereby recovering the rare-earth hydroxides.

Table 12 shows the recovery ratios of the rare-earth elements and impurities recovered by the hydroxide precipitation method.

TABLE 12

| | | Impurity separation method | | | | |
|---|---|---|---|---|---|---|
| | | Example 59 Two-stage solvent extraction method | | | Example 60 Oxalate precipitation method | Example 61 Hydroxide precipitation method |
| | | Recovery No. 1 | Recovery No. 2 | Recovery No. 3 | | |
| Recovery ratio (mass %) | Sc | 0.0 | 0.0 | 90.4 | 0.0 | 95.6 |
| | Y | 93.5 | 0.2 | 0.0 | 93.4 | 86.7 |
| | La | 1.5 | 45.3 | 0.0 | 97.6 | 89.1 |
| | Pr | 0.0 | 93.4 | 0.0 | 95.9 | 85.2 |
| | Nd | 0.0 | 97.1 | 0.0 | 96.3 | 85.5 |
| | Dy | 97.8 | 1.9 | 0.0 | 94.5 | 83.9 |
| | Ca | 0.2 | 1.2 | 0.0 | 7.3 | 4.0 |
| | Al | 0.8 | 0.0 | 0.0 | 0.1 | 0.9 |
| | Si | 0.1 | 0.0 | 0.0 | 0.3 | 3.2 |
| | Ti | 20.6 | 0.0 | 0.0 | 1.1 | 0.0 |
| | Fe | 10.7 | 0.2 | 0.0 | 0.1 | 0.4 |

What is claimed is:

1. A method of recovering rare-earth elements from a raw material, the raw material being a bauxite residue produced as a by-product in a Bayer process for separating and collecting an aluminum component from bauxite,
the method comprising:
using, as the raw material, a bauxite residue having a specific surface area of 35 $m^2/g$ or more;
adding an oxidizing agent to the raw material bauxite residue at a ratio of 0.1 to 0.3 equivalent weight with respect to Fe components in the bauxite residue;
adding, to the raw material bauxite residue, a liquid leaching agent formed of an aqueous solution of at least one kind of mineral acid selected from sulfuric acid, hydrochloric acid, nitric acid, and sulfurous acid, thereby preparing a slurry having a liquid-solid ratio of 2 to 30 and a pH of 0.5 to 2.2;
subjecting the slurry to leaching treatment of the rare-earth elements under a temperature condition of room temperature to 160° C.;
subjecting the slurry after the leaching treatment to solid-liquid separation, yielding a leachate; and
separating and recovering the rare-earth elements from the leachate.

2. A method of recovering rare-earth elements according to claim 1, wherein the raw material bauxite residue comprises a bauxite residue provided from a Bayer process, which comprises using, as a raw material, bauxite powder having a specific surface area of 26 $m^2/g$ or more and treating the bauxite powder under a condition of a temperature of 160° C. or less.

3. A method of recovering rare-earth elements according to claim 1, wherein the raw material bauxite residue comprises a bauxite residue provided from a Bayer process, which comprises using, as a raw material, bauxite powder having a specific surface area of 26 $m^2/g$ or more and treating the bauxite powder under a condition of a temperature of less than 230° C., the bauxite residue containing CaO at less than 4 mass %.

4. A method of recovering rare-earth elements according to claim 1, wherein the raw material bauxite residue comprises a specific surface area fraction mainly comprising fine particles having a specific surface area of 35 $m^2/g$ or more, the specific surface area fraction being provided by applying fractionation treatment to a bauxite residue.

5. A method of recovering rare-earth elements according to claim 4, wherein the specific surface area fraction provided by applying the fractionation treatment comprises a bauxite residue yielded by subjecting a bauxite residue to classification with a sieve having a mesh size of 38 to 400 μm and removing particles on the sieve.

6. A method of recovering rare-earth elements according to claim 1, further comprising:
adding a pH adjuster to the slurry after the leaching treatment, thereby adjusting the pH thereof to 2.5 to 6;
subjecting the slurry after the adjusting of the pH to solid-liquid separation, yielding a leachate; and
separating and recovering the rare-earth elements from the leachate.

7. A method of recovering rare-earth elements according to claim 6, wherein the raw material bauxite residue is used as the pH adjuster.

8. A method of recovering rare-earth elements according to claim 1, further comprising:
prior to the separating and recovering of the rare-earth elements from the leachate, adding a pH adjuster to the leachate, thereby adjusting a pH thereof to 4 to 6;
removing hydroxides of Fe and Al precipitated owing to the adjusting of the pH by solid-liquid separation, thereby yielding a liquid; and
separating and recovering the rare-earth elements from the liquid.

9. A method of recovering rare-earth elements according to claim 8, wherein the adjusting of the pH to 4 to 6 by adding the pH adjuster to the leachate comprises adding, to the leachate, an oxidizing agent selected from hydrogen peroxide, perchloric acid, permanganic acid, and hypochlorous acid, thereby oxidizing $Fe^{2+}$ ions into $Fe^{3+}$ ions in the leachate.

10. A method of recovering rare-earth elements according to claim 1, wherein the separating and recovering of the rare-earth elements comprises:
adding a pH adjuster to one of the leachate yielded by the solid-liquid separation treatment and the liquid yielded by adjusting the pH of the leachate to cause Fe and Al to precipitate as hydroxides thereof, followed by solid-liquid separation to adjust the pH thereof to 7 or more; and
separating Ca, which is caused to precipitate owing to the pH adjustment, and hydroxides of the rare-earth elements by solid-liquid separation, thereby yielding and recovering a crude recovered product.

11. A method of recovering rare-earth elements according to claim 1, wherein the separating and recovering of the rare-earth elements comprises:
adding oxalic acid to one of the leachate yielded by performing the solid-liquid separation treatment and the liquid yielded by adjusting the pH of the leachate to cause Fe and Al to precipitate as hydroxides thereof, followed by solid-liquid separation, at a ratio of a chemical equivalent weight equal to or more than that of the rare-earth elements existing therein, to cause the rare-earth elements to precipitate as oxalates thereof; and
separating the oxalates by solid-liquid separation, thereby yielding and recovering a crude recovered product comprising the rare-earth elements.

12. A method of recovering rare-earth elements according to claim 8, wherein the separating and recovering of the rare-earth elements comprises:
adding an extractant to one of the leachate yielded by performing the solid-liquid separation treatment and the liquid yielded by adjusting the pH of the leachate to cause Fe and Al to precipitate as hydroxides thereof, followed by solid-liquid separation, the extractant being prepared by diluting an ester selected from phosphoric acid esters, phosphonic acid esters, phosphinic acid esters, thiophosphinic acid esters, and mixtures of these esters and at least one of tributyl phosphate and trioctylphosphine oxide with a solvent selected from hexane, benzene, toluene, octanol, and kerosene, which is a petroleum fraction; and
separating and recovering a crude recovered product comprising the rare-earth elements by a solvent extraction method.

13. A method of recovering rare-earth elements according to claim 12, further comprising, prior to the separating and recovering of the crude recovered product by the solvent extraction method, removing emulsion which occurs during the adjusting of the pH of the leachate in advance by filtration.

14. A method of recovering rare-earth elements according to claim 12, further comprising:
prior to the separating and recovering of the crude recovered product by the solvent extraction method, adjusting the pH of the leachate to 2.5 to 3.5; and
removing a resultant precipitate.

15. A method of recovering rare-earth elements according to claim 14, wherein the adjusting of the pH performed prior to the separating and recovering of the crude recovered product by the solvent extraction method comprising adding a bauxite residue.

16. A method of recovering rare-earth elements according to claim 12, wherein the ester used in the extractant used in the solvent extraction method comprises bis(2-ethylhexyl)hydrogen phosphate.

17. A method of recovering rare-earth elements according to claim 16, wherein the bis(2-ethylhexyl) hydrogen phosphate used in the extractant used in the solvent extraction method has a concentration of 0.1 to 1.5 M.

18. A method of recovering rare-earth elements according to claim 12, wherein an extraction time in the solvent extraction method is 5 minutes or less.

19. A method of recovering rare-earth elements according to claim 18, wherein the extraction time in the solvent extraction method is 0.5 to 3 minutes.

20. A method of recovering rare-earth elements according to claim 16, further comprising performing pre-extraction of the leachate by using one of mono-2-ethylhexyl 2-ethylhexyl phosphonate, tributyl phosphate, and naphthenic acid as a pre-extractant, thereby separating Fe, Sc, and Ti from the leachate, prior to the solvent extraction method which uses the bis(2-ethylhexyl) hydrogen phosphate as the extractant.

21. A method of recovering rare-earth elements according to claim 12, wherein, in the solvent extraction method, a back extractant comprises a 2 N to 8 N aqueous solution of hydrochloric acid and a back extraction time is 5 minutes or less.

22. A method of recovering rare-earth elements according to claim 21, wherein the back extraction time in the solvent extraction method is 0.5 to 3 minutes.

23. A method of recovering rare-earth elements according to claim 12, wherein a back extractant used in the solvent extraction method comprises an aqueous solution of sulfuric acid having a concentration of 30 to 70 mass % and the rare-earth elements are recovered as solid sulfates.

24. A method of recovering rare-earth elements according to claim 23, wherein a back extraction time in the solvent extraction method is 5 minutes or less.

25. A method of recovering rare-earth elements according to claim 12, wherein the solvent extraction method comprises:
subjecting a used extractant to back extraction by using one of a 2 N to 8 N aqueous solution of hydrochloric acid and an alkaline aqueous solution as a back extractant to reduce Sc, Ti, and Th accumulating in the used extractant; and
using the resultant used extractant as a recycled extractant.

26. A method of recovering rare-earth elements according to claim 12, further comprising separating the crude recovered product into each element by dissolving the crude recovered product in an acidic aqueous solution and carrying out a solvent extraction method which uses an extractant prepared by diluting an ester selected from phosphoric acid esters, phosphonic acid esters, phosphinic acid esters, thiophosphinic acid esters, and mixtures of these esters and at least one of tributyl phosphate and trioctylphosphine oxide with a solvent selected from hexane, benzene, toluene, and kerosene, which is a petroleum fraction.

27. A method of recovering rare-earth elements according to claim 26, wherein the solvent extraction method performed for separating the crude recovered product into the each element comprises a countercurrent multistage solvent extraction method.

28. A method of recovering rare-earth elements according to claim 1, wherein a solid component prepared by drying the raw material bauxite residue under drying conditions of 110° C. and 2 hours comprises oxides of Sc, Y, and lanthanoids, which belong to rare-earth elements, at a total ratio of 1,500 to 10,000 ppm.

* * * * *